United States Patent
Das Sharma

(10) Patent No.: US 11,223,446 B2
(45) Date of Patent: Jan. 11, 2022

(54) FORWARD ERROR CORRECTION MECHANISM FOR DATA TRANSMISSION ACROSS MULTI-LANE LINKS

(71) Applicant: Intel Corporation, Santa Clara, CA (US)

(72) Inventor: Debendra Das Sharma, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/991,681

(22) Filed: Aug. 12, 2020

(65) Prior Publication Data

US 2020/0374037 A1    Nov. 26, 2020

Related U.S. Application Data

(63) Continuation of application No. 16/224,583, filed on Dec. 18, 2018, now Pat. No. 10,771,189.

(51) Int. Cl.
*H04L 1/00*    (2006.01)

(52) U.S. Cl.
CPC .......... *H04L 1/0041* (2013.01); *H04L 1/0076* (2013.01); *H04L 2001/0096* (2013.01)

(58) Field of Classification Search
CPC ................ H04L 1/0041; H04L 1/0076; H04L 2001/0096
See application file for complete search history.

(56) References Cited

U.S. PATENT DOCUMENTS

| | | |
|---|---|---|
| 6,400,728 B1 | 6/2002 | Ott |
| 6,411,654 B1 | 6/2002 | Furutani et al. |
| 7,124,333 B2 | 10/2006 | Fukushima et al. |
| 7,127,653 B1 | 10/2006 | Gorshe |
| 7,958,431 B2 | 6/2011 | Hollums |
| 7,995,696 B1 | 8/2011 | Norrie |

(Continued)

FOREIGN PATENT DOCUMENTS

| | | |
|---|---|---|
| EP | 1253729 A2 | 10/2002 |
| EP | 2634983 A2 | 9/2013 |

(Continued)

OTHER PUBLICATIONS

EPO; Extended European Search Report issued in EP Patent Application No. 20194485.7, dated Mar. 1, 2021; 9 pages.

(Continued)

*Primary Examiner* — Kyle Vallecillo
(74) *Attorney, Agent, or Firm* — Alliance IP, LLC

(57) ABSTRACT

Systems and devices can include a first port of a first device coupled to a second port of a second device across a multi-lane link. The first port can augment a data block with error correcting code by distributing error correcting code evenly across each lane of the data block, wherein each lane of the data block includes a same number of error correcting code. The first port can transmit the data block with the per-lane error correcting code to the second port across the multi-lane link. The second port can determine error correcting code based on the error correcting code bits received in the data block, and perform error correction on the symbols of the data block based on the error correcting code received.

26 Claims, 12 Drawing Sheets

(56) References Cited

U.S. PATENT DOCUMENTS

| | | |
|---|---|---|
| 8,400,728 B2 | 3/2013 | Thompson et al. |
| 8,417,847 B2 | 4/2013 | McNutt et al. |
| 9,311,268 B1 | 4/2016 | Chen et al. |
| 10,210,040 B2 | 2/2019 | Circello et al. |
| 10,250,436 B2 | 4/2019 | Sharma |
| 10,372,647 B2 | 8/2019 | Lovett et al. |
| 10,784,986 B2 | 9/2020 | Sharma |
| 2003/0110422 A1 | 6/2003 | Naffziger et al. |
| 2003/0198252 A1 | 10/2003 | Thrysoe |
| 2004/0264960 A1 | 12/2004 | Maciocco et al. |
| 2005/0063701 A1 | 3/2005 | Ovadia et al. |
| 2005/0160346 A1 | 7/2005 | Yamane |
| 2005/0172091 A1 | 8/2005 | Rotithor et al. |
| 2005/0193312 A1 | 9/2005 | Smith et al. |
| 2006/0123328 A1 | 6/2006 | Tonami et al. |
| 2007/0098007 A1 | 5/2007 | Prodan et al. |
| 2007/0229327 A1 | 10/2007 | Chen et al. |
| 2008/0008471 A1 | 1/2008 | Dress |
| 2008/0140686 A1 | 6/2008 | Hong et al. |
| 2008/0141095 A1 | 6/2008 | Cai et al. |
| 2009/0201805 A1 | 8/2009 | Begen et al. |
| 2009/0241009 A1 | 9/2009 | Kong et al. |
| 2009/0276686 A1 | 11/2009 | Liu et al. |
| 2010/0036997 A1 | 2/2010 | Brewer et al. |
| 2010/0229071 A1 | 9/2010 | Ganga et al. |
| 2011/0099411 A1 | 4/2011 | Lin |
| 2011/0134909 A1 | 6/2011 | Huang et al. |
| 2011/0219279 A1 | 9/2011 | Abu-Surra et al. |
| 2012/0119753 A1 | 5/2012 | Kim |
| 2012/0137184 A1 | 5/2012 | Nakamura |
| 2012/0240017 A1 | 9/2012 | Uchida |
| 2012/0314586 A1 | 12/2012 | Yamamoto et al. |
| 2013/0246878 A1 | 9/2013 | Pancholi et al. |
| 2014/0006677 A1 | 1/2014 | Iyer et al. |
| 2014/0112339 A1* | 4/2014 | Safranek .......... G06F 12/0808 370/389 |
| 2014/0115374 A1* | 4/2014 | Iyer ................. G06F 13/1673 713/400 |
| 2014/0115420 A1 | 4/2014 | Willey et al. |
| 2014/0122963 A1 | 5/2014 | Motwani et al. |
| 2014/0126580 A1 | 5/2014 | Sampath et al. |
| 2015/0163170 A1 | 6/2015 | Birrittella |
| 2015/0222533 A1* | 8/2015 | Birrittella ............. H04L 45/74 370/392 |
| 2015/0256288 A1 | 9/2015 | Tanaka et al. |
| 2015/0309873 A1 | 10/2015 | Yoon et al. |
| 2015/0347015 A1 | 12/2015 | Pawlowski |
| 2016/0085619 A1 | 3/2016 | Iyer et al. |
| 2016/0099795 A1 | 4/2016 | Lusted et al. |
| 2016/0179427 A1* | 6/2016 | Jen ..................... G06F 3/0625 711/147 |
| 2016/0179610 A1* | 6/2016 | Morris ............... H04L 1/0082 714/56 |
| 2016/0179647 A1* | 6/2016 | Das Sharma ....... H03M 13/09 714/736 |
| 2016/0179710 A1* | 6/2016 | Das Sharma ...... G06F 13/1642 710/310 |
| 2016/0179718 A1* | 6/2016 | Morris ............... G06F 13/4221 710/308 |
| 2016/0179730 A1* | 6/2016 | Halleck ............. G06F 13/1678 710/105 |
| 2016/0182265 A1 | 6/2016 | Shulman et al. |
| 2016/0248682 A1 | 8/2016 | Lee et al. |
| 2016/0261375 A1 | 9/2016 | Roethig et al. |
| 2016/0283112 A1* | 9/2016 | Blankenship .......... G06F 3/061 |
| 2016/0283303 A1* | 9/2016 | Sharma ............. G06F 11/0727 |
| 2016/0283375 A1* | 9/2016 | Das Sharma ...... G06F 12/084 |
| 2016/0283388 A1* | 9/2016 | Blankenship ....... G06F 12/0891 |
| 2016/0283399 A1* | 9/2016 | Das Sharma ....... G06F 13/1663 |
| 2016/0337079 A1 | 11/2016 | Ran |
| 2016/0377679 A1* | 12/2016 | Froelich ........... G01R 31/31703 714/735 |
| 2017/0004098 A1* | 1/2017 | Das Sharma ....... G06F 12/1475 |
| 2017/0017604 A1 | 1/2017 | Chen et al. |
| 2017/0034165 A1 | 2/2017 | Bagal et al. |
| 2017/0141794 A1 | 5/2017 | Tyson et al. |
| 2017/0163286 A1* | 6/2017 | Wu .......................... G06F 13/36 |
| 2017/0222686 A1 | 8/2017 | Khan et al. |
| 2017/0270062 A1* | 9/2017 | Sharma ............... G06F 13/4286 |
| 2017/0351795 A1 | 12/2017 | Ghattas et al. |
| 2018/0083855 A1 | 3/2018 | Weiny et al. |
| 2018/0095923 A1 | 4/2018 | Iyer et al. |
| 2018/0191523 A1 | 7/2018 | Shah et al. |
| 2018/0205431 A1 | 7/2018 | Nammi |
| 2018/0248650 A1 | 8/2018 | Sharma |
| 2018/0254943 A1 | 9/2018 | Sharma |
| 2019/0095380 A1 | 3/2019 | Sharma |
| 2019/0227972 A1 | 7/2019 | Hor et al. |
| 2019/0243700 A1* | 8/2019 | Brewer .................. H04L 69/18 |
| 2019/0294579 A1 | 9/2019 | Sharma |
| 2019/0305888 A1 | 10/2019 | Sharma |
| 2019/0372904 A1* | 12/2019 | Dress ..................... H04L 12/44 |
| 2020/0012555 A1 | 1/2020 | Sharma |
| 2020/0145341 A1 | 5/2020 | Sharma |
| 2020/0186414 A1 | 6/2020 | Sharma |
| 2020/0226018 A1 | 7/2020 | Sharma |
| 2021/0006349 A1 | 1/2021 | Das |

FOREIGN PATENT DOCUMENTS

| | | |
|---|---|---|
| JP | 2010187244 A | 8/2010 |
| WO | 2015099724 A1 | 7/2015 |
| WO | 2016053519 A1 | 4/2016 |
| WO | 2017014846 A1 | 1/2017 |

OTHER PUBLICATIONS

USPTO; Non-Final Office Action issued in U.S. Appl. No. 16/723,868, dated Mar. 29, 2021; 11 pages.

EPO; Extended European Search Report issued in EP Patent Application No. 21150857.7, dated Jul. 13, 2021; 13 pages.

USPTO; Non-Final Office Action issued in U.S. Appl. No. 16/428,841, dated Aug. 6, 2021; 9 pages.

EPO; Extended European Search Report issued in EP Patent Application No. 21167765.3, dated Jul. 21, 2021; 8 pages.

Chen, Ling-Jyh, et al. "Improving Wireless Link Throughput via Interleaved FEC", Ninth International Symposium on Computers and Communications, Alexandria, Egypt, Jul. 2004, 6 pages.

EPO; Extended European Search Report issued in EP Patent Application No. 18761600.8, dated Dec. 2, 2020; 7 pages.

EPO; Extended European Search Report issued in EP Patent Application No. 20150933.8, dated Jul. 17, 2020; 8 pages.

EPO; Extended European Search Report issued in EP Patent Application No. 20165292.2, dated Jul. 10, 2020; 11 pages.

Jiajia Jiao and Yuzhuo Fu, "A cost-effective method for masking transient errors in Noc flit type," 2013 IEEE 10th International Conference on ASIC, Shenzhen, 2013, pp. 1-4. (Year: 2013).

PCT International Search Report and Written Opinion in PCT/US2018/019702, dated Jun. 4, 2018, 11 pages.

PCT International Search Report and Written Opinion issued in PCT/US2018/019583, dated Jun. 5, 2018; 15 pages.

PCT International Search Report and Written Opinion issued in PCT/US2018/019583, dated Sep. 3, 2019; 12 pages.

USPTO Non-Final Office Action in U.S. Appl. No. 16/439,582 dated Sep. 18, 2020 (12 pages).

USPTO; Corrected Notice of Allowability issued in U.S. Appl. No. 15/640,449, dated Jun. 24, 2020; 6 pages.

USPTO; Non-Final Office Action issued in U.S. Appl. No. 15/446,395, dated Jun. 1, 2018; 5 pages.

USPTO; Non-Final Office Action issued in U.S. Appl. No. 15/640,449; dated Apr. 7, 2020; 10 pages.

USPTO; Non-Final Office Action issued in U.S. Appl. No. 16/575,739, dated Jan. 7, 2021; 21 pages.

USPTO; Notice of Allowance issued in U.S. Appl. No. 15/446,395, dated Nov. 21, 2018; 8 pages.

USPTO; Notice of Allowance issued in U.S. Appl. No. 15/640,449, dated May 11, 2020; 6 pages.

(56) References Cited

OTHER PUBLICATIONS

USPTO; Notice of Allowance issued in U.S. Appl. No. 16/439,582, dated Jan. 12, 2021; 9 pages.
USPTO; U.S. Appl. No. 17/134,240, filed Dec. 25, 2020; 60 pages.
Yao, Jun, et al., "PCIe Gen4 Standards Margin Assisted Outer Layer Equalization for Cross Lane Optimization in a 16GT/s PCIe Link", retrieved from the internet at https://www.researchgate.net/publication/316009959; DesignCon, Santa Clara, California; Feb. 2017; 27 pages.
EPO Extended European Search Report in EP Application Serial No. 20153760.2 dated Mar. 26, 2020 (8 pages).
EPO Extended European Search Report in EP Application Serial No. 20153970.7 dated Mar. 26, 2020 (7 pages).
Feehrer, J., et al., "Implementation and modeling for high-performance I/0 Hub used in SPARC M7 processor-based servers", 2015 IEEE 9th International Symposium on Embedded Multicore/Many-core Systems-on-Chip, IEEE, Conference Location: Turin, Italy, Date of Conference: Sep. 23-25, 2015, pp. 275-282. (Year: 2015).
Srinvasan Murali et al: "Analysis of Error Recovery Schemes for Networks on Chips", IEEE Design & Test of Computers ( vol. 22 , Issue: 5 , Sep.-Oct. 2005 ), Sep. 26, 2005 (Sep. 26, 2005), pp. 434-442, XP055628862, DOI: 10.1109/MDT.2005.104 Retrieved from the Internet: URL:https://ieeexplore.ieee.org/elx5/54/32372/01511975.odftp=&arnumber=151I~75&isnumber=32372&ref=aHROcHMGLy9pZWVleHBsb3JIImIIZWUub3JnL2RvY3VtZW50LzE.
USPTO Final Office Action in U.S. Appl. No. 16/439,582 dated May 1, 2020 (12 pages).
USPTO Non-Final Office Action dated Jan. 10, 2020, for U.S. Appl. No. 16/439,582, 11 pages.
USPTO; Notice of Allowance issued in U.S. Appl. No. 16/948,459, dated Jun. 10, 2021; 42 pages.
EPO; Extended European Search Report issued in EP Patent Application No. 20217123.7, dated Oct. 6, 2021; 13 pages.

\* cited by examiner

| 31 | 24 23 | 16 15 | 0 | |
|---|---|---|---|---|
| Next Capability Offset | Capability Version | Extended Capability ID | | 00h |
| RsvdZ | | Next Capability Offset | | 04h |
| Lane 0 Set up Registers (Tx / Rx / etc.) for 5.0 GT/s, 16.0 GT/s, and 32.0 GT/s Data Rates (RW) | | | | 08h – xxh |
| Lane 1 Set up Registers (Tx / Rx / etc.) for 5.0 GT/s, 16.0 GT/s, and 32.0 GT/s Data Rates (RW) | | | | (xx+4)h – (2xx-4)h |
| ... | | | | |
| Lane 15 Set up Registers (Tx / Rx / etc.) for 5.0 GT/s, 16.0 GT/s, and 32.0 GT/s Data Rates (RW) | | | | |

FORWARD ERROR CORRECTION MECHANISM FOR DATA TRANSMISSION ACROSS MULTI-LANE LINKS

CROSS-REFERENCE TO RELATED APPLICATIONS

This application is a continuation (and claims the benefit of priority under 35 U.S.C. § 120) of U.S. application Ser. No. 16/224,583, filed Dec. 18, 2018 and entitled FORWARD ERROR CORRECTION MECHANISM FOR DATA TRANSMISSION ACROSS MULTI-LANE LINKS. The disclosure of the prior Application is considered part of and is incorporated by reference in the disclosure of this Application.

BACKGROUND

Forward Error Correction (FEC) is a technique used for controlling errors in data transmission over unreliable or noisy communication channels. A sender can encode a message in a redundant way by using an error-correcting code (ECC). The redundancy allows the receiver to detect a limited number of errors that may occur anywhere in the message, and often to correct these errors without re-transmission.

BRIEF DESCRIPTION OF THE DRAWINGS

FIG. 3 is a schematic diagram of a capabilities structure for TX and RX circuits to store configuration settings in accordance with embodiments of the present disclosure.

DETAILED DESCRIPTION

Figure 1:
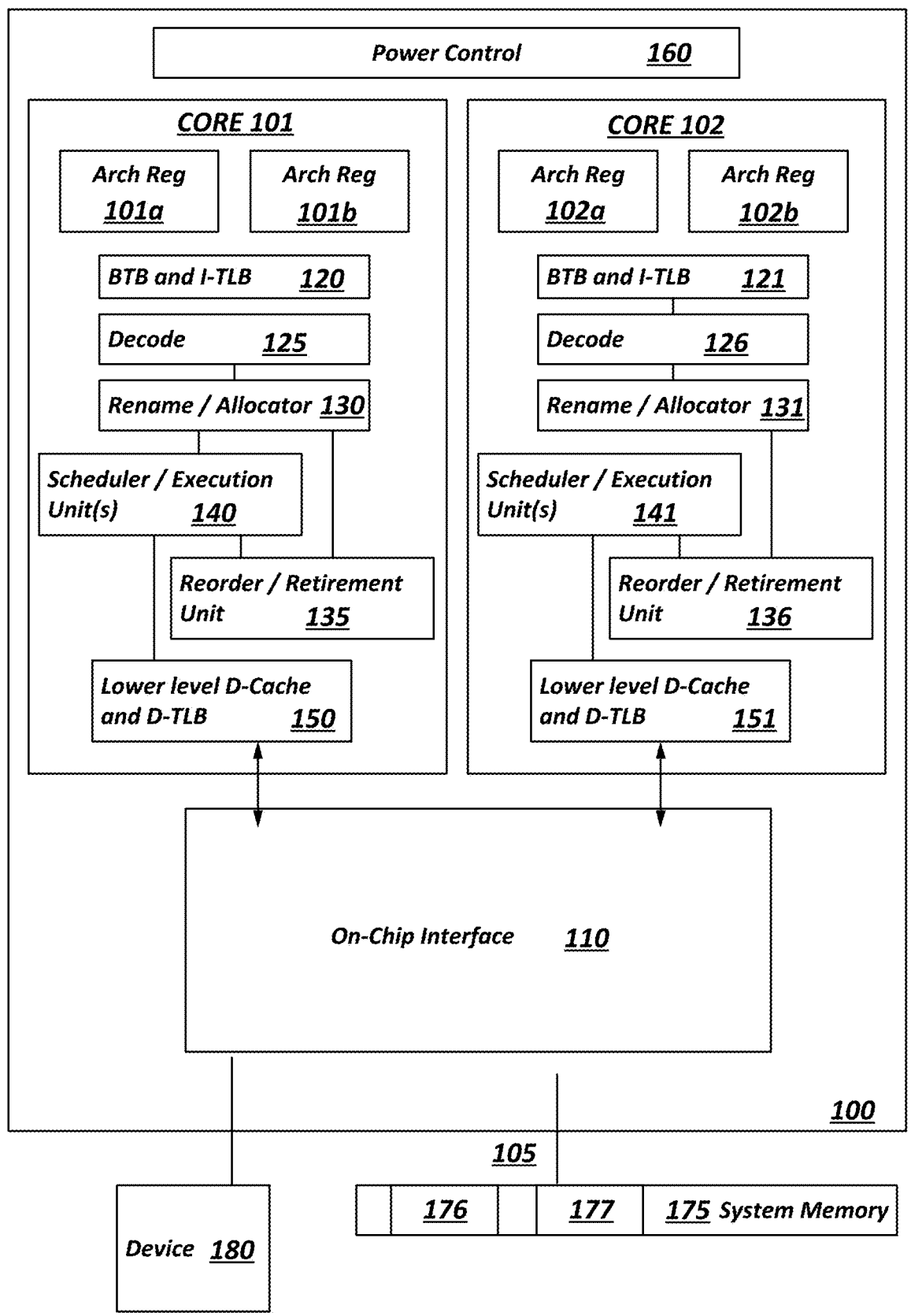
FIG. 1 illustrates an embodiment of a block diagram for a computing system including a multicore processor.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present disclosure.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future balanced with performance considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the disclosure described herein.

Referring to FIG. 1, an embodiment of a block diagram for a computing system including a multicore processor is depicted. Processor 100 includes any processor or processing device, such as a microprocessor, an embedded processor, a digital signal processor (DSP), a network processor, a handheld processor, an application processor, a co-processor, a system on a chip (SOC), or other device to execute code. Processor 100, in one embodiment, includes at least two cores—core 101 and 102, which may include asymmetric cores or symmetric cores (the illustrated embodiment). However, processor 100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 100, as illustrated in FIG. 1, includes two cores—core 101 and 102. Here, core 101 and 102 are considered symmetric cores, i.e. cores with the same configurations, functional units, and/or logic. In another embodiment, core 101 includes an out-of-order processor core, while core 102 includes an in-order processor core. However, cores 101 and 102 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 101 are described in further detail below, as the units in core 102 operate in a similar manner in the depicted embodiment.

As depicted, core 101 includes two hardware threads 101a and 101b, which may also be referred to as hardware thread slots 101a and 101b. Therefore, software entities, such as an operating system, in one embodiment potentially view processor 100 as four separate processors, i.e., four logical processors or processing elements capable of executing four software threads concurrently. As alluded to above, a first thread is associated with architecture state registers 101a, a second thread is associated with architecture state registers 101b, a third thread may be associated with architecture state registers 102a, and a fourth thread may be associated with architecture state registers 102b. Here, each of the architecture state registers (101a, 101b, 102a, and 102b) may be referred to as processing elements, thread slots, or thread units, as described above. As illustrated, architecture state registers 101a are replicated in architecture state registers 101b, so individual architecture states/contexts are capable of being stored for logical processor 101a and logical processor 101b. In core 101, other smaller resources, such as instruction pointers and renaming logic in allocator and renamer block 130 may also be replicated for threads 101a and 101b. Some resources, such as re-order buffers in reorder/retirement unit 135, ILTB 120, load/store buffers, and queues may be shared through partitioning. Other resources, such as general purpose internal registers, page-table base register(s), low-level data-cache and data-TLB 115, execution unit(s) 140, and portions of out-of-order unit 135 are potentially fully shared.

Processor 100 often includes other resources, which may be fully shared, shared through partitioning, or dedicated by/to processing elements. In FIG. 1, an embodiment of a purely exemplary processor with illustrative logical units/resources of a processor is illustrated. Note that a processor may include, or omit, any of these functional units, as well as include any other known functional units, logic, or firmware not depicted. As illustrated, core 101 includes a simplified, representative out-of-order (OOO) processor core. But an in-order processor may be utilized in different embodiments. The OOO core includes a branch target buffer 120 to predict branches to be executed/taken and an instruction-translation buffer (I-TLB) 120 to store address translation entries for instructions.

Core 101 further includes decode module 125 coupled to fetch unit 120 to decode fetched elements. Fetch logic, in one embodiment, includes individual sequencers associated with thread slots 101a, 101b, respectively. Usually core 101 is associated with a first ISA, which defines/specifies instructions executable on processor 100. Often machine code instructions that are part of the first ISA include a portion of the instruction (referred to as an opcode), which references/specifies an instruction or operation to be performed. Decode logic 125 includes circuitry that recognizes these instructions from their opcodes and passes the decoded instructions on in the pipeline for processing as defined by the first ISA. For example, as discussed in more detail below decoders 125, in one embodiment, include logic designed or adapted to recognize specific instructions, such as transactional instruction. As a result of the recognition by decoders 125, the architecture or core 101 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 126, in one embodiment, recognize the same ISA (or a subset thereof). Alternatively, in a heterogeneous core environment, decoders 126 recognize a second ISA (either a subset of the first ISA or a distinct ISA).

In one example, allocator and renamer block 130 includes an allocator to reserve resources, such as register files to store instruction processing results. However, threads 101a and 101b are potentially capable of out-of-order execution, where allocator and renamer block 130 also reserves other resources, such as reorder buffers to track instruction results. Unit 130 may also include a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) block 140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 101 and 102 share access to higher-level or further-out cache, such as a second level cache associated with on-chip interface 110. Note that higher-level or further-out refers to cache levels increasing or getting further way from the execution unit(s). In one embodiment, higher-level cache is a last-level data cache—last cache in the memory hierarchy on processor 100—such as a second or third level data cache. However, higher level cache is not so limited, as it may be associated with or includes an instruction cache. A trace cache—a type of instruction cache—instead may be coupled after decoder 125 to store recently decoded traces. Here, an instruction potentially refers to a macro-instruction (i.e. a general instruction recognized by the decoders), which may decode into a number of micro-instructions (micro-operations).

In the depicted configuration, processor 100 also includes on-chip interface module 110. Historically, a memory controller, which is described in more detail below, has been included in a computing system external to processor 100. In this scenario, on-chip interface 110 is to communicate with devices external to processor 100, such as system memory 175, a chipset (often including a memory controller hub to connect to memory 175 and an I/O controller hub to connect peripheral devices), a memory controller hub, a northbridge, or other integrated circuit. And in this scenario, bus 105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 175 may be dedicated to processor 100 or shared with other devices in a system. Common examples of types of memory 175 include DRAM, SRAM, non-volatile memory (NV memory), and other known storage devices. Note that device 180 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 100. For example in one embodiment, a memory controller hub is on the same package and/or die with processor 100. Here, a portion of the core (an on-core portion) 110 includes one or more controller(s) for interfacing with other devices such as memory 175 or a graphics device 180. The configuration including an interconnect and controllers for interfacing with such devices is often referred to as an on-core (or un-core configuration). As an example, on-chip interface 110 includes a ring interconnect for on-chip communication and a high-speed serial point-to-point Link 105 for off-chip communication. Yet, in the SOC environment, even more devices, such as the network interface, co-processors, memory 175, graphics processor 180, and any other known computer devices/interface may be integrated on a single die or integrated circuit to provide small form factor with high functionality and low power consumption.

In one embodiment, processor 100 is capable of executing a compiler, optimization, and/or translator code 177 to compile, translate, and/or optimize application code 176 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail.

As data rates in serial interconnects, such as PCIe, continue to increase, bit error rates (BER) of $10^{-12}$ can be difficult to maintain across the hundreds of lanes per System on Chip (SoC). Various elements contributing to cross-talk, inter-symbol interference (ISI), and channel loss can arise from the socket, the vias, the board, the connector, and the add-in card (AIC). Next generation interconnect technology (e.g., PCIe Gen 6) targeting 64 GT/s could use pulse amplitude modulation (PAM)-4 and can target a lower BER, such as $10^{-6}$, similar to what Ethernet has already done for 50G and 100G data rates with target BER as low as $10^{-4}$.

With lower target BERs such as these, Forward Error Correction (FEC) can be employed to correct the errors to bring up the effective BER to the desired $10^{-12}$ or better. This disclosure describes systems and techniques of using FEC to decrease BER while addressing latency and bandwidth loss due to the error correcting code (ECC) bits.

High latency can be prohibitive for load-store applications such as PCIe, coherency links such as Quick Path Interconnect (QPI)/Ultra Path Interconnect (UPI), serial memory interconnects, or converged I/O, memory and coherency links such as Intel Accelerator Links (IAL). These interfaces would either run wider but slower to avoid paying the latency penalty or run in constrained channels at higher frequency to avoid paying the latency penalty. This disclosure mitigates the latency problem by having a parallel FEC and mitigates the bandwidth loss problem through encoding changes.

Embodiments of the present disclosure may facilitate the next speed upgrade for PCI Express (PCIe) beyond PCIe Gen 4 (e.g., PCIe Gen 5, Gen 6) at a lower BER (bit error rate) by the use of forward error correction (FEC). FEC can extend the channel reach while maintaining full backwards compatibility, even in the presence of retimer(s). Even though the invention is described in the context of PCIe Gen 6, those skilled in the art will realize that the concepts are applicable to other interconnects (such as future generations of multi-Lane Links such as coherency/memory links, USB, etc.) if FEC is used.

Aspects of the embodiments may relate to PCIe 5.0 or higher using FEC in a backwards compatible manner, if needed. Implementation choices may include one or more of the following:

The disclosure involves three elements: (i) parallel FEC w/ Retimer pass through applicable across the Link, if needed; (ii) removal of sync header (sync hdr) to regain bandwidth loss due to FEC with the corresponding Data Stream to Ordered Set transition rules; and (iii) reducing the data rate of operation to a value where FEC would not be needed for a given channel and Tx/Rx pairs across the Link, for super latency critical applications (such as memory expansion buses). The systems and techniques described herein can achieve low latency in the high bandwidth interconnect, including PCIe, coherency links, IAL, memory interconnect, etc.

More specifically, FEC is applicable across the entire Link including Retimers, if any. Retimers are expected to not perform error correction in-line for latency optimization. The ECC code word is striped across all Lanes to reduce the latency (as opposed to the per-Lane FEC). Removal of the Sync Hdr can mitigate the bandwidth loss due to FEC with corresponding Data Block to Ordered Set transition rule changes.

The disclosure describes using FEC code that is applicable on the entire Link across all Lanes and Segments. The same FEC is applied across all Lanes. Retimers can pass the bits without checking and correcting for bit errors for latency optimization or perform the FEC depending on the way the Downstream Port instructs them to perform during initial link training based on the platform requirements.

Even though the disclosure is described in the context of PCIe Gen 6, those skilled in the art will realize that the concepts are applicable to other interconnects (such as future generations of multi-Lane Links such as coherency/memory links, USB, etc.) if FEC is used.

Figure 2A:
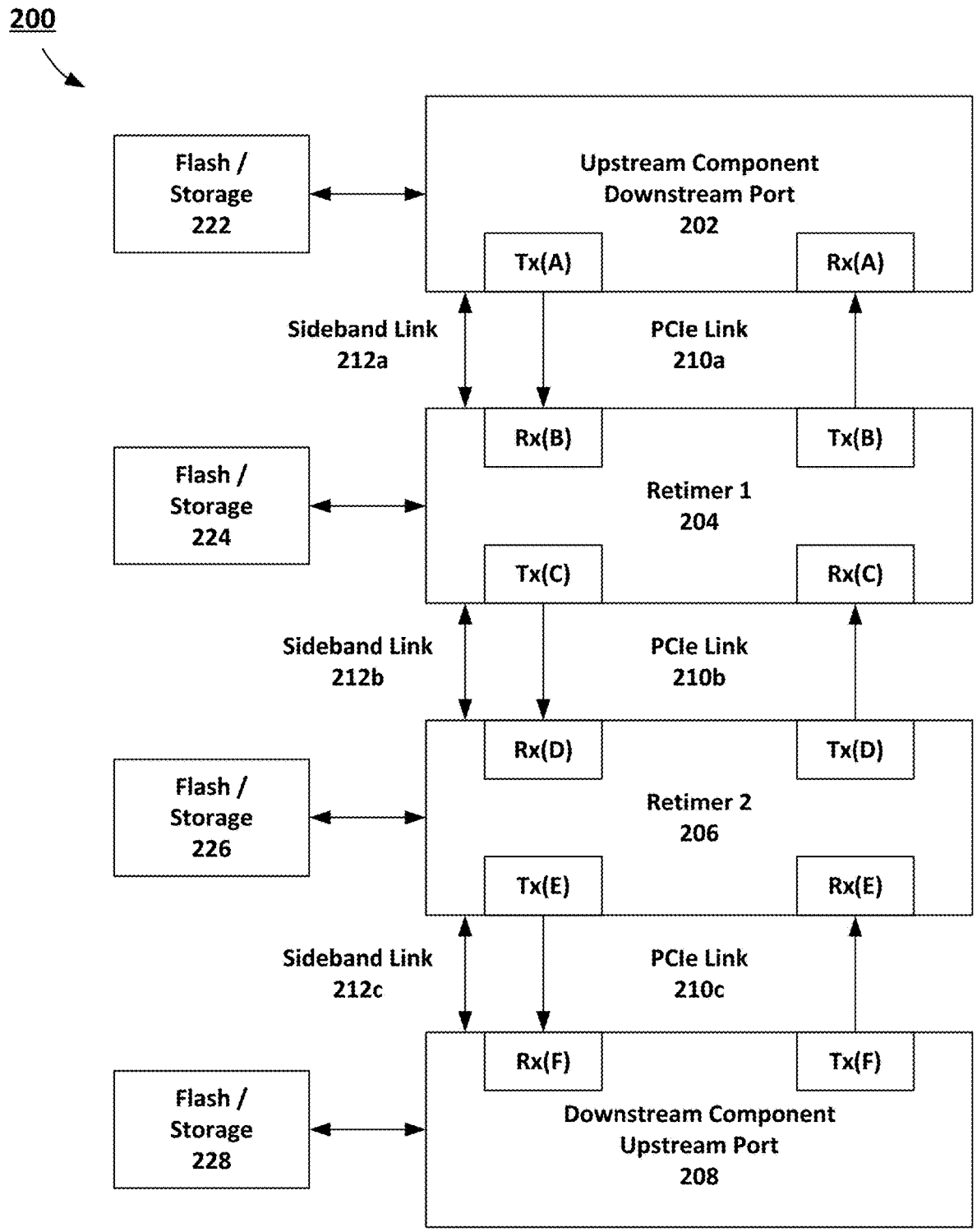
FIG. 2A is a schematic diagram of an interlinked system that includes two retimers in accordance with embodiments of the present disclosure.

FIG. 2A is a schematic and timing diagram illustrating a sample topology 200 with two re-timers 204 and 206 between an upstream component downstream port 202 and a downstream component upstream port 208 in accordance with embodiments of the present disclosure. The upstream component downstream port 202 can be a port for a PCIe-based device, such as a CPU or other device capable of generating a data packet and transmitting the data packet across a data Link compliant with the PCIe protocol. The downstream component upstream port 208 can be a port for a peripheral component that can receive a data packet from a Link compliant with the PCIe protocol. It is understood that the upstream component downstream port 202 and the downstream component upstream port 208 can transmit and receive data packets across PCIe Link(s), illustrated as PCIe Link 210a-c.

The topology 200 can include one or more retimers 204 and 206. Retimers 204 and 206 can serve as a signal repeater operating at the physical layer to fine tune the signal from the upstream component 202 and/or the downstream component upstream port 208. A retimer can use Continuous Time Linear Equalization (CTLE), Decision Feedback Equalization (DFE), and transmit an impulse response equalization (Tx FIR EQ, or just TxEQ). Re-timers are transparent to the data Link and transaction layers but implement the full physical layer.

The multi-Lane PCIe Link is split into three Link segments (LS) 210a, 210b, and 210c in each direction. The upstream component downstream port 202 can be coupled to retimer1 204 by a multi-Lane PCIe Link 210a. The retimer 1 204 can be coupled to retimer 2 206 by link segment 210b. And retimer 2 206 can be coupled to downstream component upstream port 208 by link segment 210c.

Components can also be coupled by sideband linkages. The upstream component downstream port 202 can be coupled to retimer1 204 by a sideband link 212a. The retimer 1 204 can be coupled to retimer 2 206 by sideband link 212b. And retimer 2 206 can be coupled to downstream component upstream port 208 by sideband link 212c.

A primary function of a retimer (buffer) device is signal re-timing. These functions are performed by retimers 204 and 206. The particular retimer device circuits will depend on the PHY being used for the link. Generally, retimer circuitry is configured to recover the incoming signal and retransmit using a local clock and new transmit equalization circuitry, and may typically employ well-known circuitry for this purpose, such as phase lock loops. A retimer may further comprise transmitter and receiver circuitry including one or more amplifier circuits, as well as various types of well-known signal-conditioning circuitry used to increase the drive level of a received signal. Such retimer circuitry is well-known to those skilled in the high-speed interconnect arts, and, accordingly, no further details are shown or discussed herein.

Each retimer 204 and 206 can have an upstream path and a downstream path. In some implementations, a retimer can include two pseudo ports, and the pseudo ports can determine their respective downstream/upstream orientation dynamically. Further, retimers 204 and 206 can support operating modes including a forwarding mode and an executing mode. Retimers 204 and 206 in some instances can decode data received on the sub-link and re-encode the data that it is to forward downstream on its other sublink. As such, retimers may capture the received bit stream prior to regenerating and re-transmitting the bit stream to another device or even another retimer (or redriver or repeater). In some cases, the retimer can modify some values in the data it receives, such as when processing and forwarding ordered set data. Additionally, a retimer can potentially support any width option as its maximum width, such as a set of width options defined by a specification such as PCIe.

As data rates of serial interconnects (e.g., PCIe, UPI, USB, etc.) increase, retimers are increasingly used to extend the channel reach. Multiple retimers can be cascaded for even longer channel reach. It is expected that as signal speeds increase, channel reach will typically decrease as a general matter. Accordingly, as interconnect technologies accelerate, the use of retimers may become more common. As an example, as PCIe Gen-4, with its 16 GT/s, is adopted in favor of PCIe Gen-3 (8 GT/s), the use of retimers in PCIe interconnects may increase, as may be the case in other interconnects as speeds increase.

In one implementation, a common BGA (Ball Grid Array) footprint may be defined for PCI Express Gen-4 (16 GT/s) based retimers. Such a design may address at least some of the example shortcomings found in conventional PCIe Gen-3 (8 GT/s) retimer devices, as well as some of the issues emerging with the adoption of PCIe Gen-4. Further, for PCIe Gen-4, the number of retimer vendors and volume are expected to increase. Due to signal losses from the doubled data rate (from 8 GT/s to 16 GT/s), the interconnect length achievable is significantly decreased in Gen-4. In this and other example interconnect technologies, as data rate increases, retimers may thereby have increased utility as they can be used to dramatically increase channel lengths that would be otherwise constrained by the increased data rate.

Although shown to be separate from the upstream component and downstream component, the retimer can be part of the upstream or downstream components, on board with the upstream or downstream components, or on package with the downstream component.

The upstream component downstream port 202 can have access to a storage element 222, such as a flash storage, cache, or other memory device. The retimer 1 204 can optionally include a similar storage element 224. The retimer 2 206 can optionally include a similar storage element 226. The downstream component upstream port 208 can optionally include a similar storage element 228.

Figure 2B:
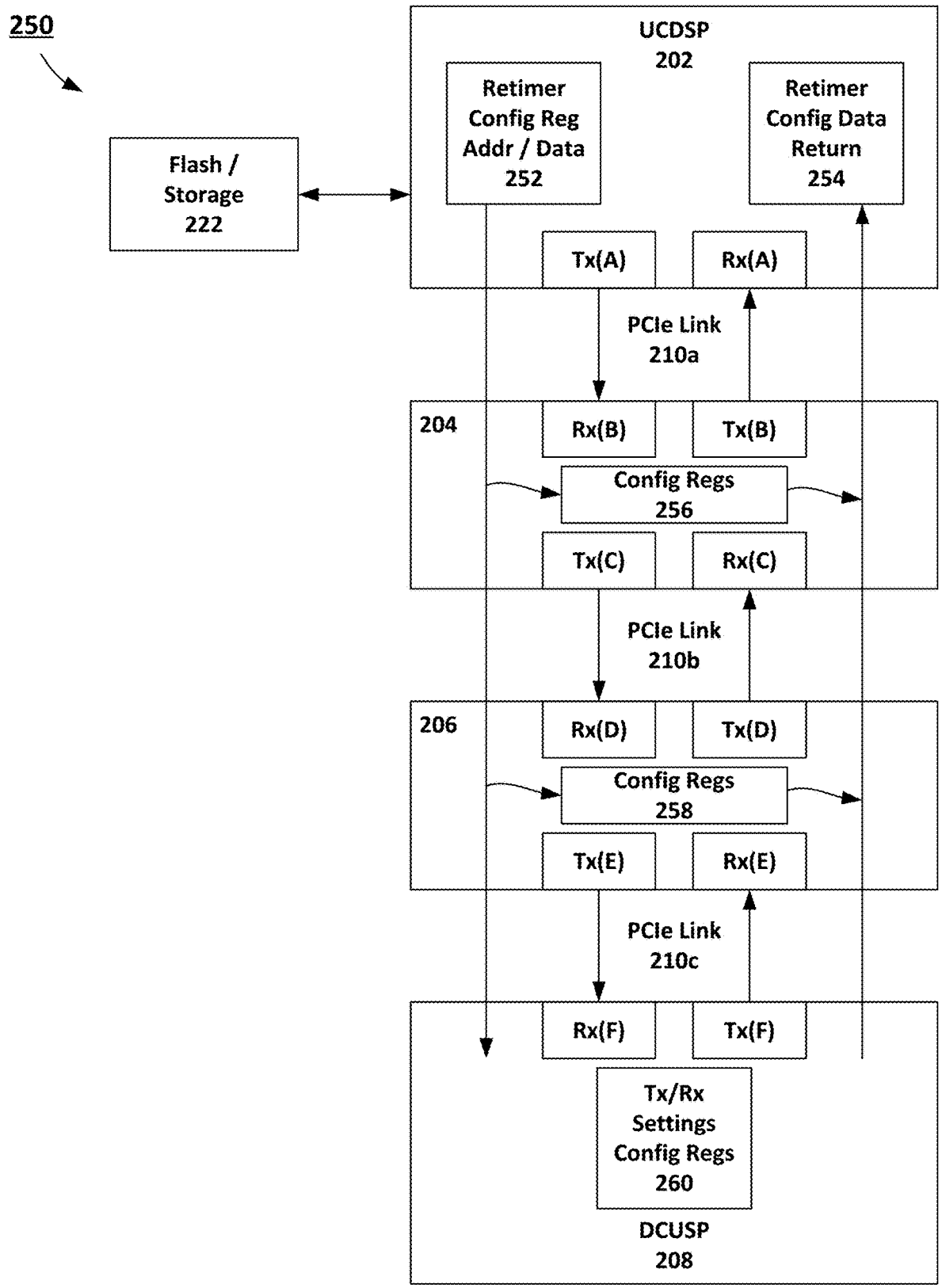
FIG. 2B is a schematic diagram of a connected system that illustrates in-band upstream port and retimer configuration in accordance with embodiments of the present disclosure.

FIG. 2B is a schematic diagram of a connected system 250 that illustrates in-band upstream port and retimer configuration in accordance with embodiments of the present disclosure. As shown in FIG. 2A, an upstream component downstream port 202 can be coupled to the downstream component upstream port 208 by a link 210*a-c* that is extended by two retimers 204, 206. In this example, the downstream port 202 can be provided with a retimer configuration register address/data register 252 to hold data to be sent in a configuration access command to one of the two retimers using fields of an enhanced SKP OS. One or more bits of the SKP OS can include a command code, data, or an address for use at a configuration register (e.g., 256, 258) of a retimer (e.g., 204, 206, respectively) to read or write data from/to the register 256, 258. Retimers can respond to configuration access commands sent by encoding data in an instance of an enhanced SKP OS by itself encoding response data in a subsequent instance of an enhanced SKP OS. Data encoded by the retimer (e.g., 204, 206) may be extracted at the downstream port and recorded in a retimer configuration data return register (e.g., 254). The registers (e.g., 252, 254) maintained at the upstream device downstream port 202 can be written to and read from by system software and/or other components of the system allowing (indirect) access to the retimer registers: one register (e.g., 252) conveying the address/data/command to the retimer and a second register (e.g., 254) that stores the responses coming back from the re-timer. In other implementations, such registers (e.g., 260) can be maintained at the downstream component upstream port 208 instead of or in addition to the registers being maintained at the upstream component downstream port 202, among other examples.

Continuing with the example of FIG. 2B, in connection with a mechanism for providing in-band access to retimer registers, the retimer may have architected registers that are addressable with well-defined bits and characteristics. In this example, an enhanced SKP OS is defined/modified as the physical layer-generated periodic pattern to carry the commands/information from "Retimer Config Reg Addr/Data" (e.g., 252) to the re-timers and carrying the responses from the re-timers back to load to "Retimer Config Data Return" (e.g., 840), with some bits allotted for CRC for the protection of data. For example, in PCIe this can include enhancing the existing SKP Ordered Set (e.g., with CSR Access and CSR Return (CRC-protected bits)). Further, a flow for ensuring guaranteed delivery of the commands/information to retimer and the corresponding response back can be defined. The physical layer mechanism can be enhanced to also include notifications from the re-timer (in addition to response) if it needs some sort of service, among other examples features.

FIG. 3 is a schematic diagram of an example capability register configuration data structure 300 in accordance with embodiments of the present disclosure. The capability register configuration data structure 300 can be used to configure TX/RX configuration registers for upstream and downstream ports, as well as for retimers. The upstream and downstream ports and retimers can parse the data structure to set register settings for various configuration parameters, including register settings that allow a port or retimer to configure, apply, and/or use parallel FEC in accordance with embodiments of the present disclosure. For example, retimers can pass the bits without checking and correcting for bit errors for latency optimization or perform the FEC depending on the way the downstream port instructs them to perform during initial link training based on the platform requirements.

Figures 4A, 4B:
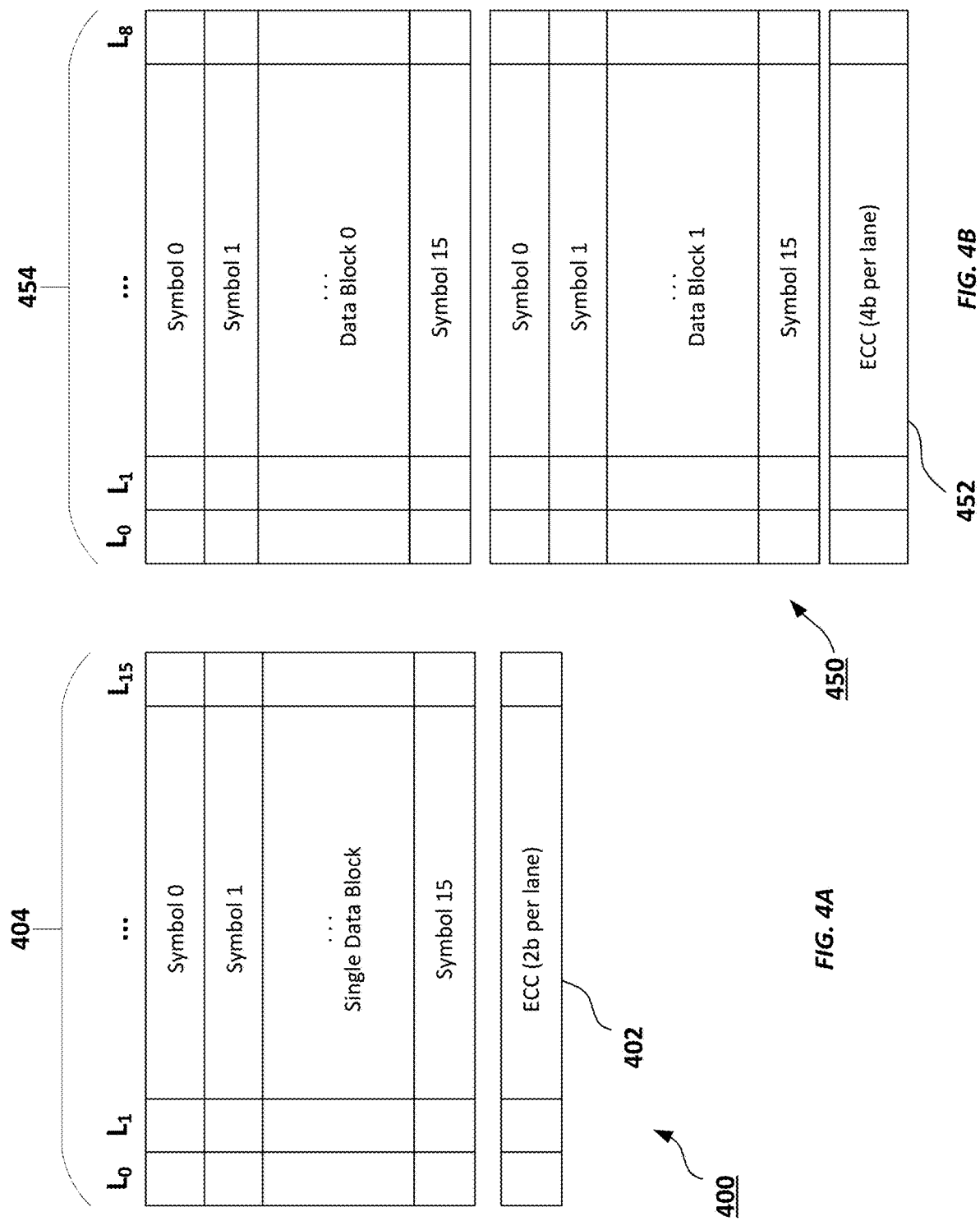
FIGS. 4A-4B are schematic diagrams illustrating error correcting code (ECC) bits organized across each lane of a multilane link in accordance with embodiments of the present disclosure.

FIGS. 4A-4B are schematic diagrams illustrating error correcting code (ECC) bits organized across each lane of a multilane link in accordance with embodiments of the present disclosure. The FEC code used in the example of FIG. 4A is 32 ECC bits covering 2048 information bits, effectively a (2080, 2048) code, such as Reed-Solomon (RS) or other Bose-Chaudhuri-Hocquenghem (BCH) code with the desired error correction properties to get the per-Lane effective BER to the desired levels. The ECC decode can be performed after the lane to lane deskew.

FIG. 4A illustrates data blocks 400 distributed across an ×16 link 404. FIG. 4A also illustrates that ECC bits 402 can be distributed across each lane L0-L15 of the ×16 link 404. For the ×16 link 404, the ECC bits 402 are distributed across each data blocks 400 as 2 bits per wire after each data block, effectively making each data block a 130-bit super block per wire.

FIG. 4B illustrates data blocks 350 distributed across a ×8 link 454. An 2×8 link 454 includes data blocks 450 organized across 2×8 lanes. The size of each data block doubles. ECC bits 452 can be arranged at the end of each data block 450, distributed across each lane of the 2×8 link 454 as 4 bits per lane, making each data block a 260 bit super block per wire. Similarly, a ×4 Link will have the ECC across 520 bits and a ×1 across 2080 bits. Thus, the latency overhead is the least with the widest link, which tend to be most latency sensitive. In FIG. 4B, two data blocks are to be transmitted (or received) in a single data transaction (e.g., across the ×8 lane link). The error correcting code is added after the second (or last) data block (DB1) for the data transaction.

FEC is as applicable across the entire link including retimers, if any. Retimers are expected to not perform error correction in-line for latency optimization. The ECC code word is striped across all lanes to reduce the latency.

Figure 5A:
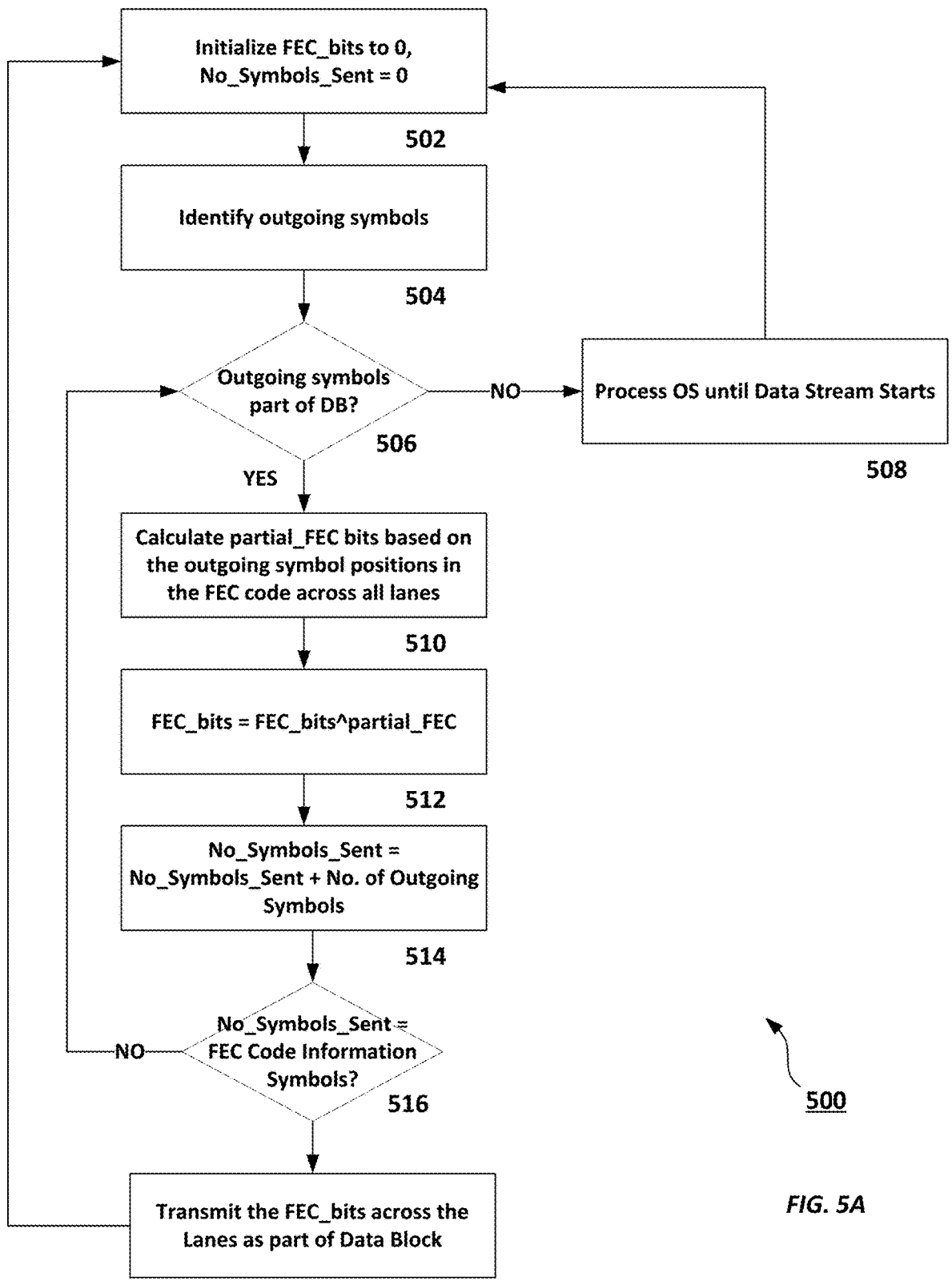
FIG. 5A is a process flow diagram for augmenting outgoing data blocks with forward error correction in accordance with embodiments of the present disclosure.

FIG. 5A is a process flow diagram 500 for augmenting outgoing data blocks with forward error correction in accordance with embodiments of the present disclosure. It is assumed that parallel (or link-wide) FEC is enabled by ports and retimers (if any) that are part of the linked system. At the outset, values use for calculating and distributing FEC bits are initialized (502). For example, a bit representing FEC_bits is initialized to 0. The FEC_bits initialization resets the FEC bit calculation for each outgoing symbol set, since FEC bits will be spread across each lane of the data block. The No_Symbols_Sent register is also set to 0. The No_Symbols_Sent value initialization tracks the start and end of data streams, for consistent FEC application across a data stream or between two data streams.

Outgoing symbols can be determined (504). That is, the port that is to transmit symbols can receive or generate symbols for outgoing transmission. If the outgoing transmission is determined to not include symbols that are part of a data block (506), then the port can process the symbols as part of an OS block (508), and the port can reinitialize FEC_bits and No_Symbols_Sent (502).

If the outgoing symbols are part of a data block (506), then the port can calculate partial FEC bits based on the outgoing symbol positions in the FEC code across all lanes of the link that the port will use to transmit the outgoing traffic (510). The partial FEC bits are determined based on the size of the data block and the number of lanes for transmission. The FEC bits can be distributed evenly at the end of the data stream; for a 32 bit ECC, the partial FEC bits can equal 32/the number of lanes. The FEC_bits can be updated determined based on the partial FEC values calculated (512); and the No_Symbols_Sent value can be updated by summing an initial or previous value with the number of outgoing symbols (514). After the number of symbols sent equals the number of FEC code information symbols (516), the port can transmit the FEC_bits across the lanes as part of the data block (518). If the number of symbols sent has not yet reached the number of FEC code information symbols (514), then the port can determine again whether the outgoing symbols for transmission are part of a data block (506) and the process can continue with updated values for FEC_bits and No_Symbols_Sent.

Figure 5B:
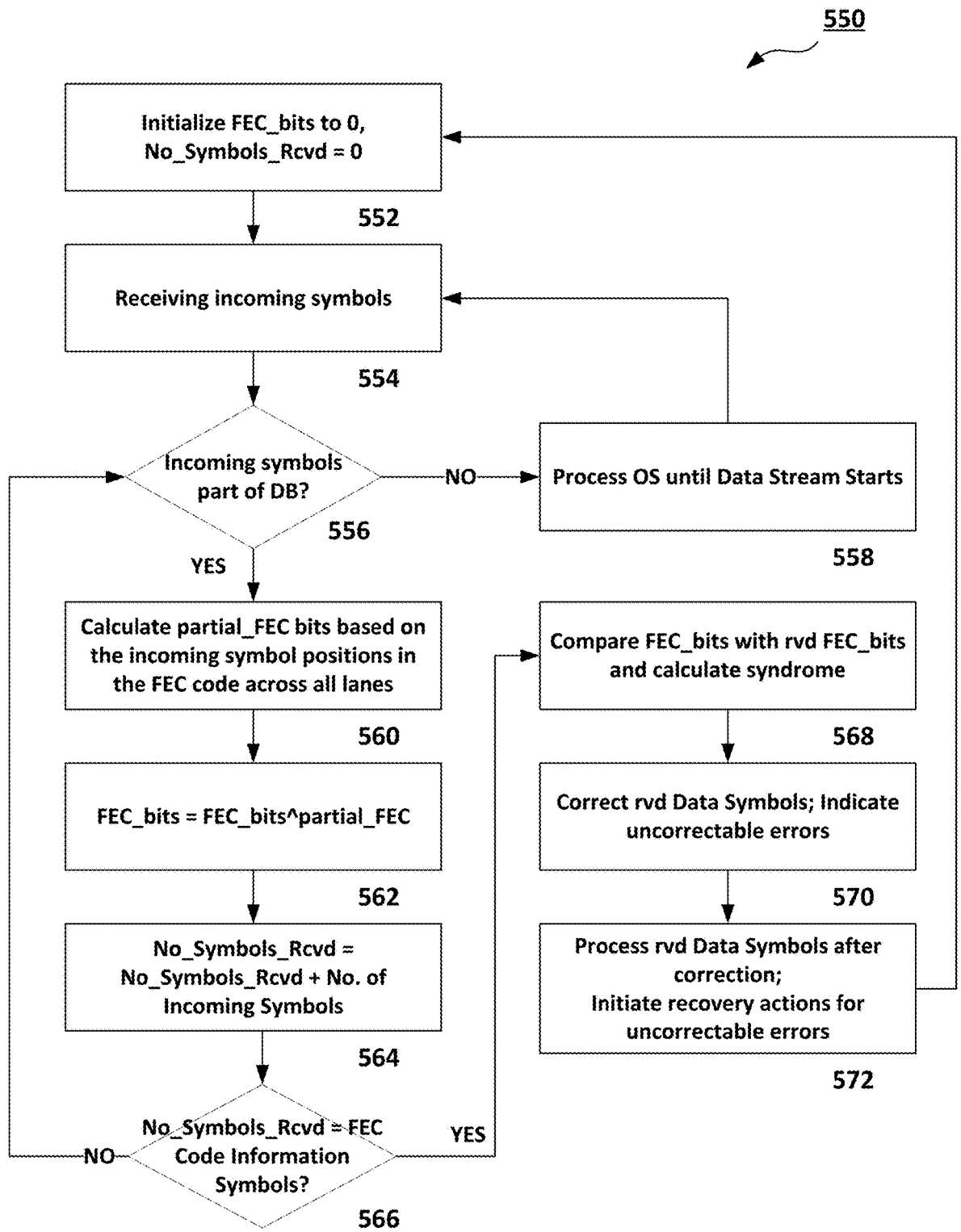
FIG. 5B is a process flow diagram for receiving data blocks with forward error correction in accordance with embodiments of the present disclosure.

FIG. 5B is a process flow diagram 550 for receiving data blocks with forward error correction in accordance with embodiments of the present disclosure. It is assumed that parallel (or link-wide) FEC is enabled. At the outset, values use for calculating and distributing FEC bits are initialized (552). For example, a bit representing FEC_bits is initialized to 0. The FEC_bits initialization resets the FEC bit calculation for each outgoing symbol set, since FEC bits will be spread across each lane of the data block. The No_Symbols_Rcvd register is also set to 0. The No_Symbols_Rcvd value initialization tracks the start and end of data streams, for consistent FEC application across a data stream or between two data streams.

Symbols can be received by the port (554). If the incoming transmission is determined to not include symbols that are part of a data block (556), then the port can process the symbols as part of an OS block (508), and the port can reinitialize FEC_bits and No_Symbols_Rcvd (552).

If the incoming symbols are part of a data block (556), then the port can calculate partial FEC bits based on the incoming symbol positions in the FEC code across all lanes of the link that the port uses to receive the traffic (560). The partial FEC bits are determined based on the size of the data block and the number of lanes for the link. The FEC bits can be distributed evenly at the end of the data stream; for a 32 bit ECC, the partial FEC bits can equal 32/the number of lanes. The FEC_bits can be updated determined based on the partial FEC values calculated (562); and the No_Symbols_Rcvd value can be updated by summing an initial or previous value with the number of incoming symbols (564). After the number of symbols received equals the number of FEC code information symbols (566), the port can compare the FEC_bits with the received FEC_bits and calculate a syndrome vector for determining errors in parity between the two sets of bits (568). The port can correct errors in the received data symbols using ECC received with the data block (570). The port can also indicate uncorrectable errors. In either case, errors are logged. The port can then process the received data symbols after the correction, and can initiate recovery actions for uncorrectable errors (572).

If the number of symbols received has not yet reached the number of FEC code information symbols (566), then the port can determine again whether the outgoing symbols for transmission are part of a data block (556) and the process can continue with updated values for FEC_bits and No_Symbols_Rcvd.

Aspects of the embodiments also can include the removal of sync hdr bits to mitigate the bandwidth loss due to FEC with corresponding Data Block to Ordered Set transition rule changes. Removal of the sync hdr bit can allow the link to reclaim 1.5% of bandwidth loss.

During a data stream, an Ordered Set (OS) is sent after a fixed interval. For example, a SKiP (SKP) OS can be sent every 375 blocks without separate reference clock independent spread spectrum clocking (SRIS) and every 37 blocks with SRIS. This implies that a transaction layer packet (TLP) or data link layer packet (DLLP) can straddle across two data blocks separated by a SKP OS. This straddling helps the retimers figure out the location of the SKP OS to perform their clock compensation function. When a port wants to send electric idle EIOS (to enter a link power management state) or an EIEOS (to enter recovery state), the EIOS or EIEOS have to occur in those boundary.

A SKP OS after Data Blocks at the specified interval (e.g., after 375 data blocks) indicates that the data stream continues after the SKP OS.

An EIOS after Data Blocks at the specified interval indicates the end of the data stream and the link enter Electrical Idle (EI). Any clock compensation must be accounted for during the time the link will be in EI state.

An EIEOS after Data Blocks at the specified interval indicates the end of the data stream and the link will enter Recovery state. A SKP OS must follow the EIEOS for clock compensation.

Ordered Sets also are sent without the Sync Hdr. The SDS Ordered Set will be used (without the sync hdr) to indicate the start of a data stream.

The system and techniques described above for distributing ECC bits across lanes can work in the presence of sync header (hdr) bits. In that case, the sync hdr bits are protected through the marker packets that exist in PCIe and need not be covered by the FEC code. Such a protection scheme for sync hdr and ordered sets is described below:

Ordered Sets such as skip (SKP) Ordered Set cannot be covered by FEC since the number of SKP symbols between the transmit port and receive port can change due to clock compensation adjustment. However, it is important that an alternate protection mechanism for SKP Ordered Set is present since any errors there can cause possible data corruption issues. A SKP Ordered Set includes 4 to 20 SKPs followed by one SKP_END (or SKP_END_CTL) followed by 3 Symbols. The SKP Ordered Set should be modified (as shown in Table below) so the Port transmits 10 SKPs followed by 3 SKP_END (or SKP_END_CTL)s followed by the 3 Symbols. A Port can accept a SKP as long as it sees at least 2 SKP or SKP_END (or SKP_END_CTL) in the first four Symbols and accept the SKP_END (or SKP_END_CTL) as long as it sees at least one SKP_END (or SKP_END_CTL) in the last two Symbols of the prior 4-Symbol block or the first Symbol of a 4-Symbol block. Each Retimer removes the SKP Symbol from the start of the block so that at least 3 SKP_END (or SKP_END_CTL) are scheduled to be delivered to the USP/DSP.

An EIOS Ordered Set sequence should be 3 consecutive EIOS so that at least one will be delivered even in the presence of errors.

An SDS Ordered Set can be modified to have the first 4 Symbols as E1h and the remaining 12 Symbols as 55h (as opposed to the first Symbol as E1h and the following 15 Symbols as 55h). An SDS Ordered Set must be accepted as long as at least one E1h is received in a 4-Symbol boundary and the rest of the Symbols in the block have at least 8 consecutive 55h Symbols.

The TS1/TS2 Ordered Sets need not be covered by an error protection scheme since they are sent periodically, with the sending 16 TS2 Ordered Set transmitted sets be increased to 24. One can potentially cover the TS1/TS2 Ordered Sets and SDS Ordered Set with an ECC (either scrambled or not), with a requirement that the SDS be placed on the nth Block. The FTS need not be ECC protected since it is used to train. One can send three EIEOS (instead of one) followed by SDS to deal with any error on the EIEOS, while using the SDS protection mechanism described above. Table 1 provides a description for the symbol numbers for certain SKP Ordered Sets.

TABLE 1

Partial Ordered Set Symbol Number and Value Descriptions.

| Symbol Number | Value | Description |
| --- | --- | --- |
| 0 through (4*N − 3) [N can be 1 through 5] | AAh | SKP Symbol. Symbol 0 is the SKP Ordered Set identifier. |
| 4*N − 2, 4*N − 2, 4*N | E1 h or 78 h | SKP_END or SKP_END_CTL Symbol (depending on Standard or Control SKP Ordered Set) Signifies the end of the SKP Ordered Set after three more Symbols. |
| 4*N + 1, 4*N + 2, 4*N + 3 | 00-FFh | Misc stuff such as Err_cnt, LFSR, or Margin Related Command/Status depending on the type of SKP Ordered Set and LTSSM state |

In some instances, error correlation across Lanes (e.g., cross talk or power supply noise) may reduce the effective BER with FEC. However, the cross talk is expected to be low for differential links and is expected to be part of the jitter budget. The power supply noise effects are expected to be low and part of the jitter budget with staggered enabling/disabling of lanes on link up/down transitions. The parallel FEC described herein can be enabled during the initial link training from the downstream port, based on the platform requirements. If not enabled, a default can be a per-Lane FEC, avoiding lane to lane dependency but pay the latency penalty. In that case, the rules around sync hdr removal can still be applied for recovering the bandwidth loss.

Even though the disclosure is described in the context of PCIe Gen 6, those skilled in the art will realize that the concepts are applicable to other interconnects (such as future generations of multi-Lane Links such as coherency/memory links, USB, etc.) if FEC is used.

One interconnect fabric architecture includes the Peripheral Component Interconnect (PCI) Express (PCIe) architecture. A primary goal of PCIe is to enable components and devices from different vendors to inter-operate in an open architecture, spanning multiple market segments; Clients (Desktops and Mobile), Servers (Standard and Enterprise), and Embedded and Communication devices. PCI Express is a high performance, general purpose I/O interconnect defined for a wide variety of future computing and communication platforms. Some PCI attributes, such as its usage model, load-store architecture, and software interfaces, have been maintained through its revisions, whereas previous parallel bus implementations have been replaced by a highly scalable, fully serial interface. The more recent versions of PCI Express take advantage of advances in point-to-point interconnects, Switch-based technology, and packetized protocol to deliver new levels of performance and features. Power Management, Quality Of Service (QoS), Hot-Plug/Hot-Swap support, Data Integrity, and Error Handling are among some of the advanced features supported by PCI Express.

Figure 6:
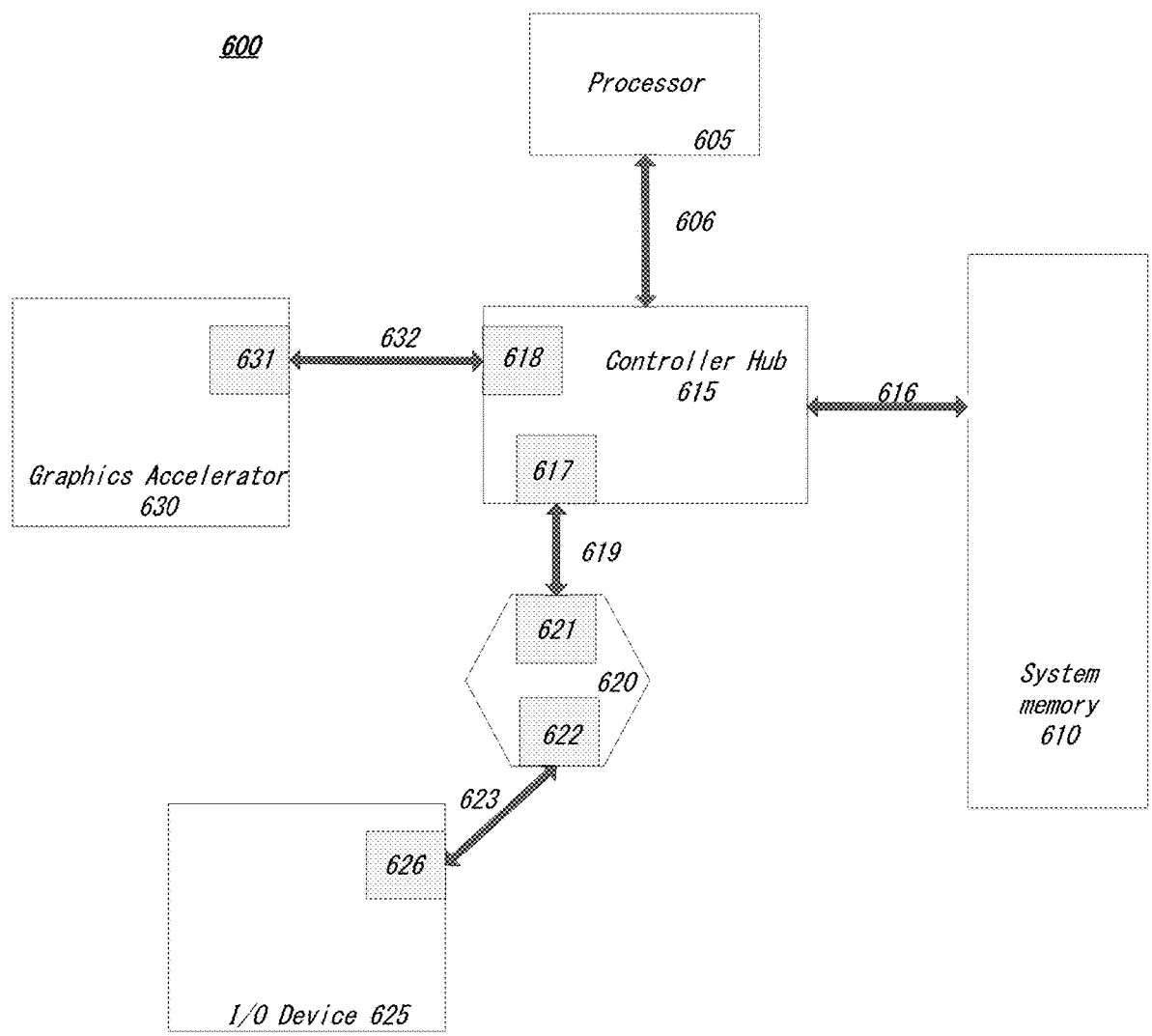
FIG. 6 illustrates an embodiment of a computing system including an interconnect architecture.

Referring to FIG. 6, an embodiment of a fabric composed of point-to-point Links that interconnect a set of components is illustrated. System 600 includes processor 605 and system memory 610 coupled to controller hub 615. Processor 605 includes any processing element, such as a microprocessor, a host processor, an embedded processor, a co-processor, or other processor. Processor 605 is coupled to controller hub 615 through front-side bus (FSB) 606. In one embodiment, FSB 606 is a serial point-to-point interconnect as described below. In another embodiment, link 606 includes a serial, differential interconnect architecture that is compliant with different interconnect standard.

System memory 610 includes any memory device, such as random access memory (RAM), non-volatile (NV) memory, or other memory accessible by devices in system 600. System memory 610 is coupled to controller hub 615 through memory interface 616. Examples of a memory interface include a double-data rate (DDR) memory interface, a dual-channel DDR memory interface, and a dynamic RAM (DRAM) memory interface.

In one embodiment, controller hub 615 is a root hub, root complex, or root controller in a Peripheral Component Interconnect Express (PCIe or PCIE) interconnection hierarchy. Examples of controller hub 615 include a chipset, a memory controller hub (MCH), a northbridge, an interconnect controller hub (ICH) a southbridge, and a root port controller/hub. Often the term chipset refers to two physically separate controller hubs, i.e. a memory controller hub (MCH) coupled to an interconnect controller hub (ICH). Note that current systems often include the MCH integrated with processor 605, while controller 615 is to communicate with I/O devices, in a similar manner as described below. In some embodiments, peer-to-peer routing is optionally supported through root complex 615.

Here, controller hub 615 is coupled to switch/bridge 620 through serial link 619. Input/output modules 617 and 621, which may also be referred to as interfaces/ports 617 and 621, include/implement a layered protocol stack to provide communication between controller hub 615 and switch 620. In one embodiment, multiple devices are capable of being coupled to switch 620.

Switch/bridge 620 routes packets/messages from device 625 upstream, i.e. up a hierarchy towards a root complex, to controller hub 615 and downstream, i.e. down a hierarchy away from a root port controller, from processor 605 or system memory 610 to device 625. Switch 620, in one embodiment, is referred to as a logical assembly of multiple virtual PCI-to-PCI bridge devices. Device 625 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 625 may include a PCIe to PCI/PCI-X bridge to support legacy or other version PCI devices. Endpoint devices in PCIe are often classified as legacy, PCIe, or root complex integrated endpoints.

Graphics accelerator 630 is also coupled to controller hub 615 through serial link 632. In one embodiment, graphics accelerator 630 is coupled to an MCH, which is coupled to an ICH. Switch 620, and accordingly I/O device 625, is then coupled to the ICH. I/O modules 631 and 618 are also to implement a layered protocol stack to communicate between graphics accelerator 630 and controller hub 615. Similar to the MCH discussion above, a graphics controller or the graphics accelerator 630 itself may be integrated in processor 605.

Figure 7:
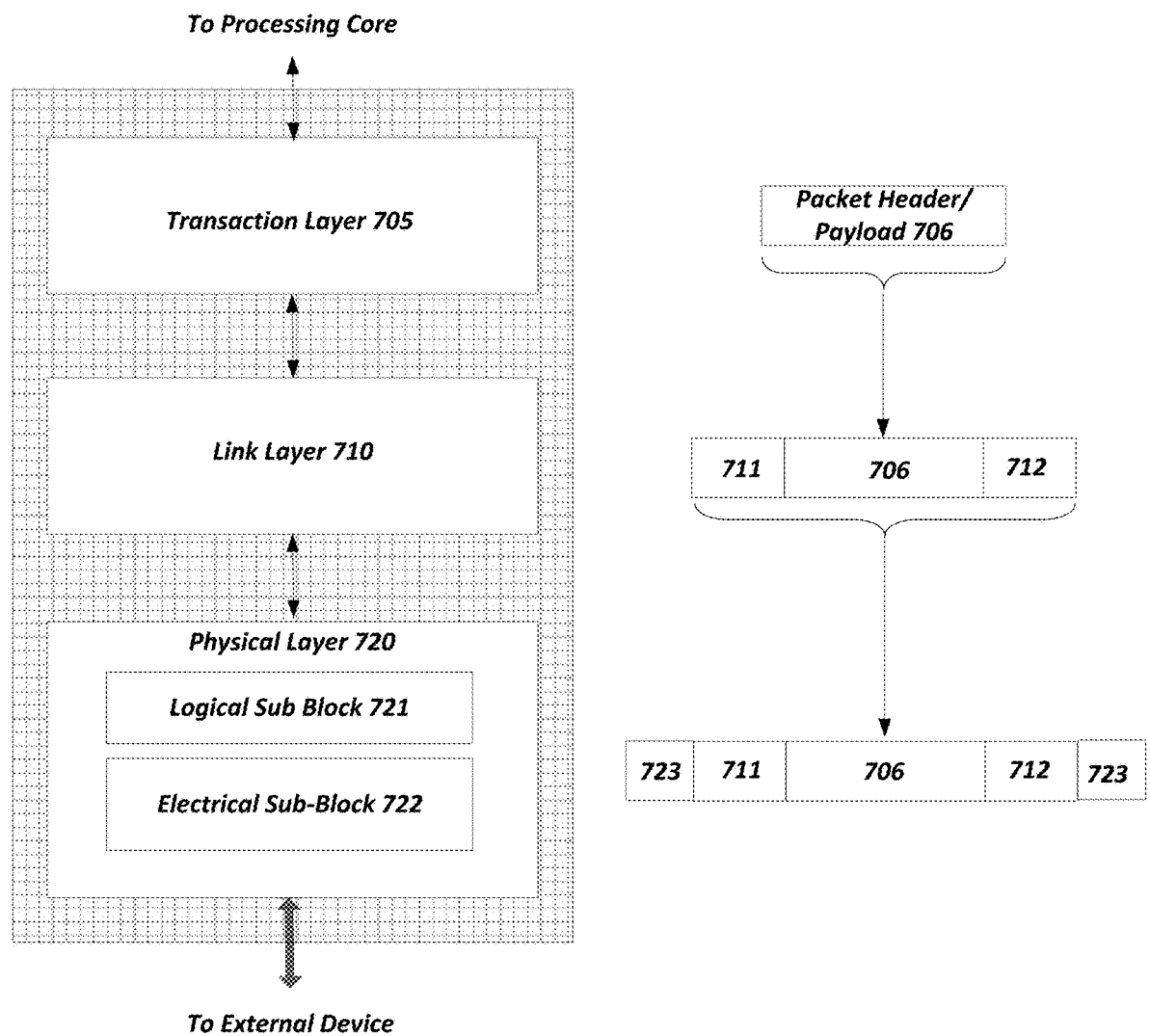
FIG. 7 illustrates an embodiment of an interconnect architecture including a layered stack.

Turning to FIG. 7 an embodiment of a layered protocol stack is illustrated. Layered protocol stack 700 includes any form of a layered communication stack, such as a Quick Path Interconnect (QPI) stack, a PCIe stack, a next generation high performance computing interconnect stack, or other layered stack. Although the discussion immediately below in reference to FIGS. 6-9 are in relation to a PCIe stack, the same concepts may be applied to other interconnect stacks. In one embodiment, protocol stack 700 is a PCIe protocol stack including transaction layer 705, link layer 710, and physical layer 720. An interface, such as interfaces 617, 618, 621, 622, 626, and 631 in FIG. 1, may be represented as communication protocol stack 700. Representation as a communication protocol stack may also be referred to as a module or interface implementing/including a protocol stack.

PCI Express uses packets to communicate information between components. Packets are formed in the Transaction Layer 705 and Data Link Layer 710 to carry the information from the transmitting component to the receiving component. As the transmitted packets flow through the other layers, they are extended with additional information necessary to handle packets at those layers. At the receiving side the reverse process occurs and packets get transformed from their Physical Layer 720 representation to the Data Link Layer 710 representation and finally (for Transaction Layer Packets) to the form that can be processed by the Transaction Layer 705 of the receiving device.

Transaction Layer

In one embodiment, transaction layer 705 is to provide an interface between a device's processing core and the interconnect architecture, such as data link layer 710 and physical layer 720. In this regard, a primary responsibility of the transaction layer 705 is the assembly and disassembly of packets (i.e., transaction layer packets, or TLPs). The translation layer 705 typically manages credit-base flow control for TLPs. PCIe implements split transactions, i.e. transactions with request and response separated by time, allowing a link to carry other traffic while the target device gathers data for the response.

In addition PCIe utilizes credit-based flow control. In this scheme, a device advertises an initial amount of credit for each of the receive buffers in Transaction Layer 705. An external device at the opposite end of the link, such as controller hub 115 in FIG. 1, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe devices. Transactions to the configuration space include read requests and write requests. Message space transactions (or, simply messages) are defined to support in-band communication between PCIe agents.

Therefore, in one embodiment, transaction layer 705 assembles packet header/payload 706. Format for current packet headers/payloads may be found in the PCIe specification at the PCIe specification website.

Figure 8:
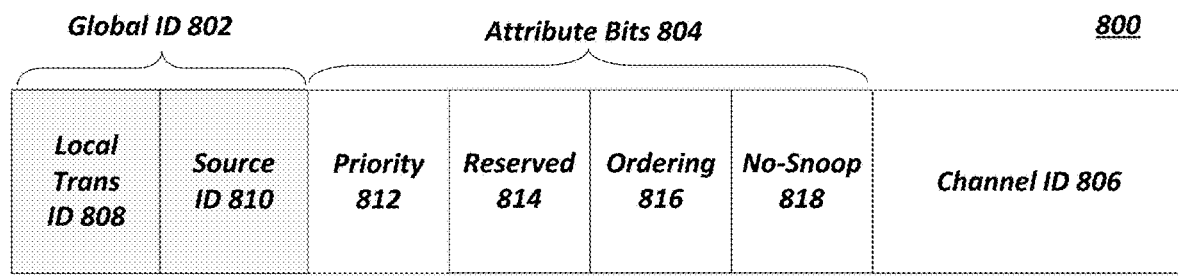
FIG. 8 illustrates an embodiment of a request or packet to be generated or received within an interconnect architecture.

Quickly referring to FIG. 8, an embodiment of a PCIe transaction descriptor is illustrated. In one embodiment, transaction descriptor 800 is a mechanism for carrying transaction information. In this regard, transaction descriptor 800 supports identification of transactions in a system. Other potential uses include tracking modifications of default transaction ordering and association of transaction with channels.

Transaction descriptor 800 includes global identifier field 802, attributes field 804, and channel identifier field 806. In the illustrated example, global identifier field 802 is depicted comprising local transaction identifier field 808 and source identifier field 810. In one embodiment, global transaction identifier 802 is unique for all outstanding requests.

According to one implementation, local transaction identifier field 808 is a field generated by a requesting agent, and it is unique for all outstanding requests that require a completion for that requesting agent. Furthermore, in this example, source identifier 810 uniquely identifies the requestor agent within a PCIe hierarchy. Accordingly, together with source ID 810, local transaction identifier 808 field provides global identification of a transaction within a hierarchy domain.

Attributes field 804 specifies characteristics and relationships of the transaction. In this regard, attributes field 804 is potentially used to provide additional information that allows modification of the default handling of transactions. In one embodiment, attributes field 804 includes priority field 812, reserved field 814, ordering field 816, and no-snoop field 818. Here, priority sub-field 812 may be modified by an initiator to assign a priority to the transaction. Reserved attribute field 814 is left reserved for future, or vendor-defined usage. Possible usage models using priority or security attributes may be implemented using the reserved attribute field.

In this example, ordering attribute field 816 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes can pass writes in the same direction, and read completions can pass writes in the same direction. Snoop attribute field 818 is utilized to determine if transactions are snooped. As shown, channel ID Field 806 identifies a channel that a transaction is associated with.

Link Layer

Link layer 710, also referred to as data link layer 710, acts as an intermediate stage between transaction layer 705 and the physical layer 720. In one embodiment, a responsibility of the data link layer 710 is providing a reliable mechanism for exchanging Transaction Layer Packets (TLPs) between two components a link. One side of the Data Link Layer 710 accepts TLPs assembled by the Transaction Layer 705, applies packet sequence identifier 711, i.e. an identification number or packet number, calculates and applies an error detection code, i.e. CRC 712, and submits the modified TLPs to the Physical Layer 720 for transmission across a physical to an external device.

Physical Layer

In one embodiment, physical layer 720 includes logical sub block 721 and electrical sub-block 722 to physically transmit a packet to an external device. Here, logical sub-block 721 is responsible for the "digital" functions of Physical Layer 721. In this regard, the logical sub-block includes a transmit section to prepare outgoing information for transmission by physical sub-block 722, and a receiver section to identify and prepare received information before passing it to the Link Layer 710.

Physical block 722 includes a transmitter and a receiver. The transmitter is supplied by logical sub-block 721 with symbols, which the transmitter serializes and transmits onto to an external device. The receiver is supplied with serialized symbols from an external device and transforms the received signals into a bit-stream. The bit-stream is de-serialized and supplied to logical sub-block 721. In one embodiment, an 8b/10b transmission code is employed, where ten-bit symbols are transmitted/received. Here, special symbols are used to frame a packet with frames 723. In addition, in one example, the receiver also provides a symbol clock recovered from the incoming serial stream.

As stated above, although transaction layer 705, link layer 710, and physical layer 720 are discussed in reference to a specific embodiment of a PCIe protocol stack, a layered protocol stack is not so limited. In fact, any layered protocol may be included/implemented. As an example, an port/interface that is represented as a layered protocol includes: (1) a first layer to assemble packets, i.e. a transaction layer; a second layer to sequence packets, i.e. a link layer; and a third layer to transmit the packets, i.e. a physical layer. As a specific example, a common standard interface (CSI) layered protocol is utilized.

Figure 9:
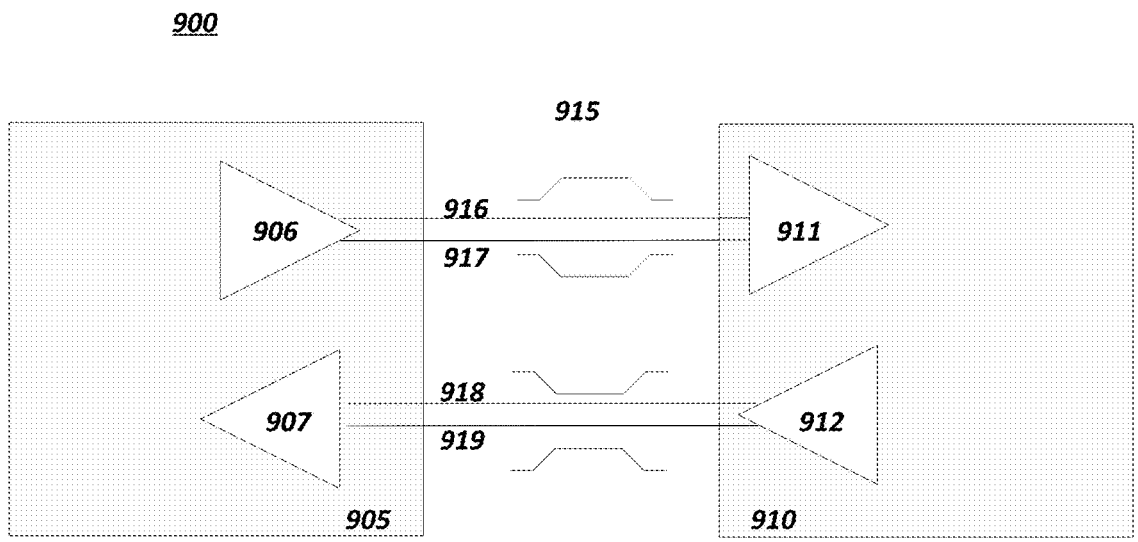
FIG. 9 illustrates an embodiment of a transmitter and receiver pair for an interconnect architecture.

Referring next to FIG. 9, an embodiment of a PCIe serial point to point fabric is illustrated. Although an embodiment of a PCIe serial point-to-point link is illustrated, a serial point-to-point link is not so limited, as it includes any transmission path for transmitting serial data. In the embodiment shown, a basic PCIe link includes two, low-voltage, differentially driven signal pairs: a transmit pair 906/911 and a receive pair 912/907. Accordingly, device 905 includes transmission logic 906 to transmit data to device 910 and receiving logic 907 to receive data from device 910. In other words, two transmitting paths, i.e. paths 916 and 917, and two receiving paths, i.e. paths 918 and 919, are included in a PCIe link.

A transmission path refers to any path for transmitting data, such as a transmission line, a copper line, an optical line, a wireless communication channel, an infrared communication link, or other communication path. A connection between two devices, such as device 905 and device 910, is referred to as a link, such as link 915. A link may support one lane—each lane representing a set of differential signal pairs (one pair for transmission, one pair for reception). To scale bandwidth, a link may aggregate multiple lanes denoted by xN, where N is any supported Link width, such as 1, 2, 4, 8, 12, 16, 32, 64, or wider.

A differential pair refers to two transmission paths, such as lines 916 and 917, to transmit differential signals. As an example, when line 916 toggles from a low voltage level to a high voltage level, i.e. a rising edge, line 917 drives from a high logic level to a low logic level, i.e. a falling edge. Differential signals potentially demonstrate better electrical characteristics, such as better signal integrity, i.e. cross-coupling, voltage overshoot/undershoot, ringing, etc. This allows for better timing window, which enables faster transmission frequencies.

Note that the apparatus, methods, and systems described above may be implemented in any electronic device or system as aforementioned. As specific illustrations, the figures below provide exemplary systems for utilizing the disclosure as described herein. As the systems below are described in more detail, a number of different interconnects are disclosed, described, and revisited from the discussion above. And as is readily apparent, the advances described above may be applied to any of those interconnects, fabrics, or architectures.

Figure 10:
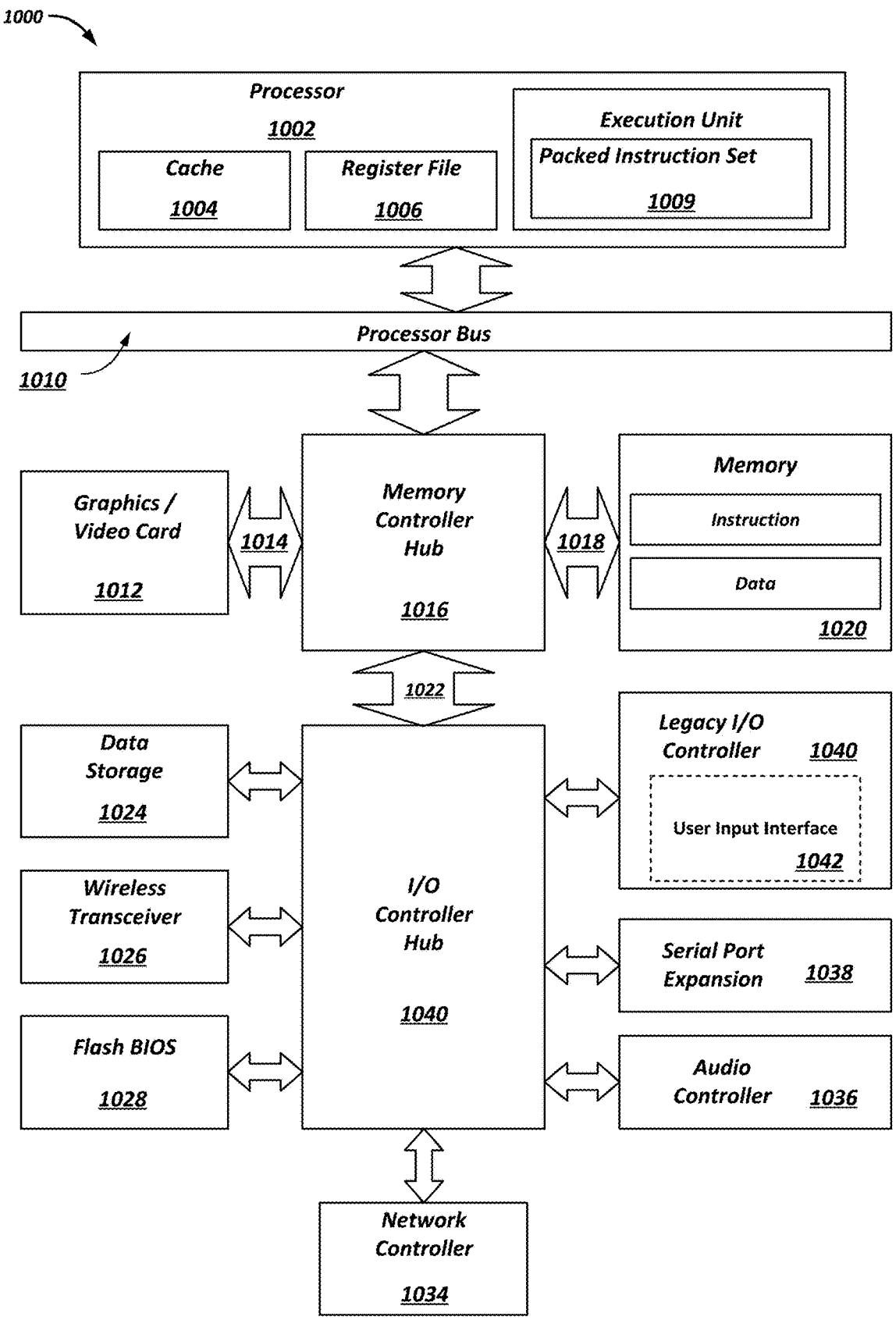
FIG. 10 illustrates another embodiment of a block diagram for a computing system including a processor.

Turning to FIG. 10, a block diagram of an exemplary computer system formed with a processor that includes execution units to execute an instruction, where one or more of the interconnects implement one or more features in accordance with one embodiment of the present disclosure is illustrated. System 1000 includes a component, such as a processor 1002 to employ execution units including logic to perform algorithms for process data, in accordance with the present disclosure, such as in the embodiment described herein. System 1000 is representative of processing systems based on the PENTIUM III™, PENTIUM 4™, Xeon™, Itanium, XScale™ and/or StrongARM™ microprocessors available from Intel Corporation of Santa Clara, Calif., although other systems (including PCs having other microprocessors, engineering workstations, set-top boxes and the like) may also be used. In one embodiment, sample system 1000 executes a version of the WINDOWS™ operating system available from Microsoft Corporation of Redmond, Wash., although other operating systems (UNIX and Linux for example), embedded software, and/or graphical user interfaces, may also be used. Thus, embodiments of the present disclosure are not limited to any specific combination of hardware circuitry and software.

Embodiments are not limited to computer systems. Alternative embodiments of the present disclosure can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that can perform one or more instructions in accordance with at least one embodiment.

In this illustrated embodiment, processor 1002 includes one or more execution units 1008 to implement an algorithm that is to perform at least one instruction. One embodiment may be described in the context of a single processor desktop or server system, but alternative embodiments may be included in a multiprocessor system. System 1000 is an example of a 'hub' system architecture. The computer system 1000 includes a processor 1002 to process data signals. The processor 1002, as one illustrative example, includes a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 1002 is coupled to a processor bus 1010 that transmits data signals between the processor 1002 and other components in the system 1000. The elements of system 1000 (e.g. graphics accelerator 1012, memory controller hub 1016, memory 1020, I/O controller hub 1024, wireless transceiver 1026, Flash BIOS 1028, Network controller 1034, Audio controller 1036, Serial expansion port 1038, I/O controller 1040, etc.) perform their conventional functions that are well known to those familiar with the art.

In one embodiment, the processor 1002 includes a Level 1 (L1) internal cache memory 1004. Depending on the architecture, the processor 1002 may have a single internal cache or multiple levels of internal caches. Other embodiments include a combination of both internal and external caches depending on the particular implementation and needs. Register file 1006 is to store different types of data in various registers including integer registers, floating point registers, vector registers, banked registers, shadow registers, checkpoint registers, status registers, and instruction pointer register.

Execution unit 1008, including logic to perform integer and floating point operations, also resides in the processor 1002. The processor 1002, in one embodiment, includes a microcode (ucode) ROM to store microcode, which when executed, is to perform algorithms for certain macroinstructions or handle complex scenarios. Here, microcode is potentially updateable to handle logic bugs/fixes for processor 1002. For one embodiment, execution unit 1008 includes logic to handle a packed instruction set 1009. By including the packed instruction set 1009 in the instruction set of a general-purpose processor 1002, along with associated circuitry to execute the instructions, the operations used by many multimedia applications may be performed using packed data in a general-purpose processor 1002. Thus, many multimedia applications are accelerated and executed more efficiently by using the full width of a processor's data bus for performing operations on packed data. This potentially eliminates the need to transfer smaller units of data across the processor's data bus to perform one or more operations, one data element at a time.

Alternate embodiments of an execution unit 1008 may also be used in micro controllers, embedded processors, graphics devices, DSPs, and other types of logic circuits. System 1000 includes a memory 1020. Memory 1020 includes a dynamic random access memory (DRAM) device, a static random access memory (SRAM) device, flash memory device, or other memory device. Memory 1020 stores instructions and/or data represented by data signals that are to be executed by the processor 1002.

Note that any of the aforementioned features or aspects of the disclosure may be utilized on one or more interconnect illustrated in FIG. 10. For example, an on-die interconnect (ODI), which is not shown, for coupling internal units of processor 1002 implements one or more aspects of the disclosure described above. Or the disclosure is associated with a processor bus 1010 (e.g. Intel Quick Path Interconnect (QPI) or other known high performance computing interconnect), a high bandwidth memory path 1018 to memory 1020, a point-to-point link to graphics accelerator 1012 (e.g. a Peripheral Component Interconnect express (PCIe) compliant fabric), a controller hub interconnect 1022, an I/O or other interconnect (e.g. USB, PCI, PCIe) for coupling the other illustrated components. Some examples of such components include the audio controller 1036, firmware hub (flash BIOS) 1028, wireless transceiver 1026, data storage 1024, legacy I/O controller 1010 containing user input and keyboard interfaces 1042, a serial expansion port 1038 such as Universal Serial Bus (USB), and a network controller 1034. The data storage device 1024 can comprise a hard disk drive, a floppy disk drive, a CD-ROM device, a flash memory device, or other mass storage device.

Figure 11:
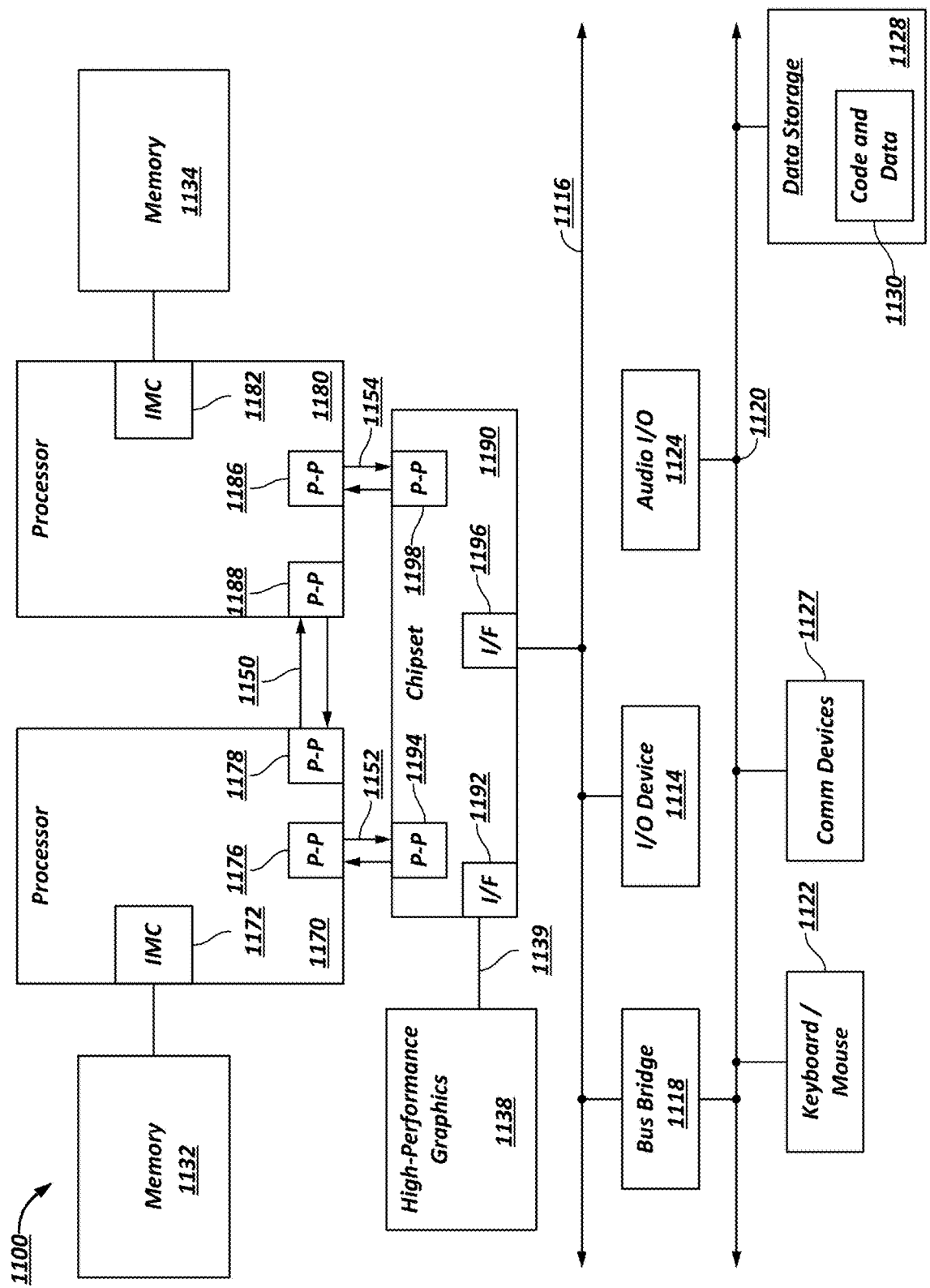
FIG. 11 illustrates an embodiment of a block for a computing system including multiple processor sockets.

Referring now to FIG. 11, shown is a block diagram of a second system 1100 in accordance with an embodiment of the present disclosure. As shown in FIG. 11, multiprocessor system 1100 is a point-to-point interconnect system, and includes a first processor 1170 and a second processor 1180 coupled via a point-to-point interconnect 1150. Each of processors 1170 and 1180 may be some version of a processor. In one embodiment, 1152 and 1154 are part of a serial, point-to-point coherent interconnect fabric, such as Intel's Quick Path Interconnect (QPI) architecture. As a result, the disclosure may be implemented within the QPI architecture.

While shown with only two processors 1170, 1180, it is to be understood that the scope of the present disclosure is not so limited. In other embodiments, one or more additional processors may be present in a given processor.

Processors 1170 and 1180 are shown including integrated memory controller units 1172 and 1182, respectively. Processor 1170 also includes as part of its bus controller units point-to-point (P-P) interfaces 1176 and 1178; similarly, second processor 1180 includes P-P interfaces 1186 and

1188. Processors 1170, 1180 may exchange information via a point-to-point (P-P) interface 1150 using P-P interface circuits 1178, 1188. As shown in FIG. 11, IMCs 1172 and 1182 couple the processors to respective memories, namely a memory 1132 and a memory 1134, which may be portions of main memory locally attached to the respective processors.

Processors 1170, 1180 each exchange information with a chipset 1190 via individual P-P interfaces 1152, 1154 using point to point interface circuits 1176, 1194, 1186, 1198. Chipset 1190 also exchanges information with a high-performance graphics circuit 1138 via an interface circuit 1192 along a high-performance graphics interconnect 1139.

A shared cache (not shown) may be included in either processor or outside of both processors; yet connected with the processors via P-P interconnect, such that either or both processors' local cache information may be stored in the shared cache if a processor is placed into a low power mode.

Chipset 1190 may be coupled to a first bus 1116 via an interface 1196. In one embodiment, first bus 1116 may be a Peripheral Component Interconnect (PCI) bus, or a bus such as a PCI Express bus or another third generation I/O interconnect bus, although the scope of the present disclosure is not so limited.

As shown in FIG. 11, various I/O devices 1114 are coupled to first bus 1116, along with a bus bridge 1118 which couples first bus 1116 to a second bus 1120. In one embodiment, second bus 1120 includes a low pin count (LPC) bus. Various devices are coupled to second bus 1120 including, for example, a keyboard and/or mouse 1122, communication devices 1127 and a storage unit 1128 such as a disk drive or other mass storage device which often includes instructions/code and data 1130, in one embodiment. Further, an audio I/O 1124 is shown coupled to second bus 1120. Note that other architectures are possible, where the included components and interconnect architectures vary. For example, instead of the point-to-point architecture of FIG. 11, a system may implement a multi-drop bus or other such architecture.

Using the various inertial and environmental sensors present in a platform, many different use cases may be realized. These use cases enable advanced computing operations including perceptual computing and also allow for enhancements with regard to power management/battery life, security, and system responsiveness.

For example with regard to power management/battery life issues, based at least on part on information from an ambient light sensor, the ambient light conditions in a location of the platform are determined and intensity of the display controlled accordingly. Thus, power consumed in operating the display is reduced in certain light conditions.

As to security operations, based on context information obtained from the sensors such as location information, it may be determined whether a user is allowed to access certain secure documents. For example, a user may be permitted to access such documents at a work place or a home location. However, the user is prevented from accessing such documents when the platform is present at a public location. This determination, in one embodiment, is based on location information, e.g., determined via a GPS sensor or camera recognition of landmarks. Other security operations may include providing for pairing of devices within a close range of each other, e.g., a portable platform as described herein and a user's desktop computer, mobile telephone or so forth. Certain sharing, in some implementations, are realized via near field communication when these devices are so paired. However, when the devices exceed a certain range, such sharing may be disabled. Furthermore, when pairing a platform as described herein and a smartphone, an alarm may be configured to be triggered when the devices move more than a predetermined distance from each other, when in a public location. In contrast, when these paired devices are in a safe location, e.g., a work place or home location, the devices may exceed this predetermined limit without triggering such alarm.

Responsiveness may also be enhanced using the sensor information. For example, even when a platform is in a low power state, the sensors may still be enabled to run at a relatively low frequency. Accordingly, any changes in a location of the platform, e.g., as determined by inertial sensors, GPS sensor, or so forth is determined. If no such changes have been registered, a faster connection to a previous wireless hub such as a Wi-Fi™ access point or similar wireless enabler occurs, as there is no need to scan for available wireless network resources in this case. Thus, a greater level of responsiveness when waking from a low power state is achieved.

It is to be understood that many other use cases may be enabled using sensor information obtained via the integrated sensors within a platform as described herein, and the above examples are only for purposes of illustration. Using a system as described herein, a perceptual computing system may allow for the addition of alternative input modalities, including gesture recognition, and enable the system to sense user operations and intent.

In some embodiments one or more infrared or other heat sensing elements, or any other element for sensing the presence or movement of a user may be present. Such sensing elements may include multiple different elements working together, working in sequence, or both. For example, sensing elements include elements that provide initial sensing, such as light or sound projection, followed by sensing for gesture detection by, for example, an ultrasonic time of flight camera or a patterned light camera.

Also in some embodiments, the system includes a light generator to produce an illuminated line. In some embodiments, this line provides a visual cue regarding a virtual boundary, namely an imaginary or virtual location in space, where action of the user to pass or break through the virtual boundary or plane is interpreted as an intent to engage with the computing system. In some embodiments, the illuminated line may change colors as the computing system transitions into different states with regard to the user. The illuminated line may be used to provide a visual cue for the user of a virtual boundary in space, and may be used by the system to determine transitions in state of the computer with regard to the user, including determining when the user wishes to engage with the computer.

In some embodiments, the computer senses user position and operates to interpret the movement of a hand of the user through the virtual boundary as a gesture indicating an intention of the user to engage with the computer. In some embodiments, upon the user passing through the virtual line or plane the light generated by the light generator may change, thereby providing visual feedback to the user that the user has entered an area for providing gestures to provide input to the computer.

Display screens may provide visual indications of transitions of state of the computing system with regard to a user. In some embodiments, a first screen is provided in a first state in which the presence of a user is sensed by the system, such as through use of one or more of the sensing elements.

In some implementations, the system acts to sense user identity, such as by facial recognition. Here, transition to a second screen may be provided in a second state, in which the computing system has recognized the user identity, where this second the screen provides visual feedback to the user that the user has transitioned into a new state. Transition to a third screen may occur in a third state in which the user has confirmed recognition of the user.

In some embodiments, the computing system may use a transition mechanism to determine a location of a virtual boundary for a user, where the location of the virtual boundary may vary with user and context. The computing system may generate a light, such as an illuminated line, to indicate the virtual boundary for engaging with the system. In some embodiments, the computing system may be in a waiting state, and the light may be produced in a first color. The computing system may detect whether the user has reached past the virtual boundary, such as by sensing the presence and movement of the user using sensing elements.

In some embodiments, if the user has been detected as having crossed the virtual boundary (such as the hands of the user being closer to the computing system than the virtual boundary line), the computing system may transition to a state for receiving gesture inputs from the user, where a mechanism to indicate the transition may include the light indicating the virtual boundary changing to a second color.

In some embodiments, the computing system may then determine whether gesture movement is detected. If gesture movement is detected, the computing system may proceed with a gesture recognition process, which may include the use of data from a gesture data library, which may reside in memory in the computing device or may be otherwise accessed by the computing device.

If a gesture of the user is recognized, the computing system may perform a function in response to the input, and return to receive additional gestures if the user is within the virtual boundary. In some embodiments, if the gesture is not recognized, the computing system may transition into an error state, where a mechanism to indicate the error state may include the light indicating the virtual boundary changing to a third color, with the system returning to receive additional gestures if the user is within the virtual boundary for engaging with the computing system.

As mentioned above, in other embodiments the system can be configured as a convertible tablet system that can be used in at least two different modes, a tablet mode and a notebook mode. The convertible system may have two panels, namely a display panel and a base panel such that in the tablet mode the two panels are disposed in a stack on top of one another. In the tablet mode, the display panel faces outwardly and may provide touch screen functionality as found in conventional tablets. In the notebook mode, the two panels may be arranged in an open clamshell configuration.

In various embodiments, the accelerometer may be a 3-axis accelerometer having data rates of at least 50 Hz. A gyroscope may also be included, which can be a 3-axis gyroscope. In addition, an e-compass/magnetometer may be present. Also, one or more proximity sensors may be provided (e.g., for lid open to sense when a person is in proximity (or not) to the system and adjust power/performance to extend battery life). For some OS's Sensor Fusion capability including the accelerometer, gyroscope, and compass may provide enhanced features. In addition, via a sensor hub having a real-time clock (RTC), a wake from sensors mechanism may be realized to receive sensor input when a remainder of the system is in a low power state.

In some embodiments, an internal lid/display open switch or sensor to indicate when the lid is closed/open, and can be used to place the system into Connected Standby or automatically wake from Connected Standby state. Other system sensors can include ACPI sensors for internal processor, memory, and skin temperature monitoring to enable changes to processor and system operating states based on sensed parameters.

In an embodiment, the OS may be a Microsoft® Windows® 8 OS that implements Connected Standby (also referred to herein as Win8 CS). Windows 8 Connected Standby or another OS having a similar state can provide, via a platform as described herein, very low ultra idle power to enable applications to remain connected, e.g., to a cloud-based location, at very low power consumption. The platform can supports 3 power states, namely screen on (normal); Connected Standby (as a default "off" state); and shutdown (zero watts of power consumption). Thus in the Connected Standby state, the platform is logically on (at minimal power levels) even though the screen is off. In such a platform, power management can be made to be transparent to applications and maintain constant connectivity, in part due to offload technology to enable the lowest powered component to perform an operation.

While this disclosure has been described with respect to a limited number of embodiments, those skilled in the art will appreciate numerous modifications and variations therefrom. It is intended that the appended claims cover all such modifications and variations as fall within the true spirit and scope of this present disclosure.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase "to" or "configured to," in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

Example is an apparatus comprising a port for transmitting data; and a multi-lane link coupled to the port. The port, in preparation to transmit a data block across the multi-lane link, to determine a bit size for each lane of the data block to be transmitted based on the number of lanes of the data block; determine error correcting code for the data block; augment the data block with the error correcting code, the error correcting code to be distributed in each lane of the data block; and transmit the data block with the error correcting code across the multi-lane link.

Example 2 may include the subject matter of example 1, wherein the port is to determine error correcting code for each lane of the data block based, at least in part, on a symbol position for the data block and a number of lanes of the data block.

Example 3 may include the subject matter of any of examples 1-2, the port to track a value for error correcting code bits determined and a number of symbols to be transmitted; and transmit the data block with error correcting code once the value for error correcting code is equal to the number of symbols to be transmitted.

Example 4 may include the subject matter of any of examples 1-3, the port to calculate error correcting code when the data block to be transmitted comprises data symbols; and process the data block as ordered set symbols without calculating error correcting code when outgoing symbols comprise ordered sets.

Example 5 may include the subject matter of any of examples 1-4, wherein the error correcting code comprises 32 total bits, and port is to determine error correcting code for each lane of the data block based on the 32 total bits and a number of lanes of the data block, wherein each lane of the link includes an equal number of error correcting code bits.

Example 6 may include the subject matter of any of examples 1-5, wherein the port is to indicate to one or more retimers that the one or more retimers are to pass along the data block without applying forward error correction on the data block.

Example 7 may include the subject matter of any of examples 1-6, wherein the port is to remove bits from the data block represent synchronization header (sync hdr) information.

Example 8 may include the subject matter of example 7, wherein the port can include in the data block a start data stream ordered set (SDS OS), the SDS OS indicating a start of a data stream to replace the sync hdr.

Example 9 is a method comprising receiving, at a port, one or more outgoing symbols for transmission; determining that the symbols are part of an outgoing data block; calculating error correcting code for the symbols based on a bit size for the error correcting code and a number of lanes for transmission of the data block; augmenting each lane of the data block with error correcting code; and transmitting the data block across a multi-lane link.

Example 10 may include the subject matter of example 9, further comprising calculating error correcting code based on a quotient of the bit size for the error correcting code and the number of lanes for the data block.

Example 11 may include the subject matter of any of examples 9-10, wherein augmenting each lane of the data block with error correcting code comprises distributing a fixed-size error correcting code evenly across each lane of the data block, wherein each lane of the data block comprises a port of the error correcting code.

Example 12 may include the subject matter of any of examples 9-11, wherein augmenting the data block with error correcting code comprises adding error correcting code to the end of a last data block of one or more data blocks to be transmitted in a single data transaction.

Example 13 may include the subject matter of any of examples 9-12, further comprising determining error correcting code for each lane of the data block based on a 32 total bits sized error correcting code and a number of lanes of the data block, wherein each lane of the link includes an equal number of error correcting code bits.

Example 14 may include the subject matter of any of examples 9-13, wherein indicating to one or more retimers that the one or more retimers are to pass along the data block without applying forward error correction on the data block.

Example 15 may include the subject matter of any of examples 9-14, further comprising preparing the data block for transmission without including bits to represent synchronization header (sync hdr) information.

Example 16 may include the subject matter of example 15, further comprising adding in the data block a start data stream ordered set (SDS OS), the SDS OS indicating a start of a data stream to replace the sync hdr.

Example 17 is one or more non-transitory computer-readable media comprising instructions to cause an apparatus, upon execution of the instructions by one or more processors of the apparatus, to receive, at a port, one or more outgoing symbols for transmission; determine that the symbols are part of an outgoing data block; calculate error correcting code for the symbols based on a bit size for the error correcting code and a number of lanes for transmission of the data block; augment each lane of the data block with error correcting code; and transmit the data block across a multi-lane link.

Example 18 may include the subject matter of example 17, the instructions to cause the apparatus to calculate error correcting code based on a quotient of the bit size for the error correcting code and the number of lanes for the data block.

Example 19 may include the subject matter of any of examples 17-18, wherein augmenting each lane of the data block with error correcting code comprises distributing a fixed-size error correcting code evenly across each lane of the data block, wherein each lane of the data block comprises a port of the error correcting code.

Example 20 may include the subject matter of any of examples 17-19, wherein augmenting the data block with error correcting code comprises adding error correcting code to the end of a last data block of one or more data blocks to be transmitted in a single data transaction.

21. Example 21 may include the subject matter of any of examples 17-20, the instructions to cause the apparatus to determine error correcting code for each lane of the data block based on a 32 total bits sized error correcting code and a number of lanes of the data block, wherein each lane of the link includes an equal number of error correcting code bits.

22. Example 22 may include the subject matter of any of examples 17-21, wherein indicating to one or more retimers that the one or more retimers are to pass along the data block without applying forward error correction on the data block.

23. Example 23 may include the subject matter of any of examples 17-22, the instructions to cause the apparatus to prepare the data block for transmission without including bits to represent synchronization header (sync hdr) information and add in the data block a start data stream ordered set (SDS OS), the SDS OS indicating a start of a data stream to replace the sync hdr.

Example 24 is an apparatus comprising a port for transmitting data; and a multi-lane link coupled to the port. The port, upon receiving a data block across the multi-lane link, to identify error correcting code from error correcting code bits received on each lane of the data block; determine errors in the data block based on the error correcting code; and correct one or more received data symbols in the data block based on a determined error and the error correcting code.

Example 25 may include the subject matter of example 24, the port to determine error correcting code for each lane of the data block based, at least in part, on a symbol position for the data block and a number of lanes of the data block.

Example 26 may include the subject matter of any of examples 24-25, the port to track a value for error correcting code bits determined and a number of symbols received; and transmit the data block with error correcting code once the value for error correcting code is equal to the number of symbols received.

Example 27 may include the subject matter of any of examples 24-26, the port to calculate error correcting code when the data block received comprises data symbols; and process the data block as ordered set symbols without calculating error correcting code when outgoing symbols comprise ordered sets.

Example 28 may include the subject matter of any of examples 24-27, wherein the error correcting code comprises 32 total bits, and port is to determine error correcting code for each lane of the data block based on the 32 total bits and a number of lanes of the data block, wherein each lane of the link includes an equal number of error correcting code bits.

Example 29 is a system that includes a first port of a first device coupled to a second port of a second device across a multi-lane link. The first port to augment a data block with error correcting code by distributing error correcting code evenly across each lane of the data block, wherein each lane of the data block includes a same number of error correcting code. The first port to transmit the data block with the per-lane error correcting code to the second port across the multi-lane link. The second port is to determine error correcting code based on the error correcting code bits received in the data block, and perform error correction on the symbols of the data block based on the error correcting code received.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

What is claimed is:

1. An apparatus comprising:
a port to transmit a data stream across a link with a plurality of lanes, wherein the port comprises:
physical layer circuitry (PHY) to:
send a data stream on the link, the data stream to be sent as a series of data stream flow control units (flits),
generate an ordered set (OS) to be sent into the data stream after a predetermined number of data stream flits; and
send the OS into the data stream after the predetermined number of data stream flits;
wherein the PHY is to:
determine error correcting code based for the data stream, and
distribute the error correcting code across the lanes of the link.

2. The apparatus of claim 1, wherein the OS is to comprise a skip ordered set (SKP OS), and the PHY is to send the SKP OS into the data stream after a predetermined number of data stream flits.

3. The apparatus of claim 2, the PHY to send another series of data stream flits after the SKP OS.

4. The apparatus of claim 1, wherein the OS comprises an electrical idle ordered set (EIOS), and the PHY is to send the EIOS at the end of the data stream.

5. The apparatus of claim 1, wherein the OS comprises comprise an electrical idle exit ordered set (EIEOS), and the PHY is to send the EIEOS at the end of the data stream.

6. The apparatus of claim 5, the PHY to send another skip ordered set (SKP OS) after the EIEOS.

7. The apparatus of claim 5, the PHY to cause the link to enter recovery after the EIEOS.

8. The apparatus of claim 1, the PHY to send a start data stream ordered set (SDS OS) before the data stream flit to indicate a start of the data stream.

9. The apparatus of claim 1, the data stream absent a sync header.

10. The apparatus of claim 9, wherein the PHY is to transmit a Start Data Stream OS (SDS OS) to indicate the beginning of the data stream.

11. A method comprising:
sending a data stream across a multilane link as a series of data stream flow control units (flits);
sending a skip ordered set (SKP OS) after sending a predetermined number of data stream flits;
determining error correcting code for the data stream flit;
adding the error correcting code to each lane of the data stream flit; and
sending the data stream flit on the multilane link with the error correcting code.

12. The method of claim 11, further comprising sending another series of data stream flits after sending the SKP OS.

13. The method of claim 11, further comprising sending an electrical idle ordered set (EIOS) at an end of the data stream.

14. The method of claim 11, further comprising:
sending an electrical idle exit ordered set (EIEOS) at an end of the data stream; and
causing the link to enter a recovery state.

15. The method of claim 14, further comprising sending another skip ordered set (SKP OS) after sending the EIEOS.

16. The method of claim 11, further comprising sending a start data stream (SDS) ordered set prior to sending the data stream flit.

17. The method of claim 11, further comprising:
sending the data stream absent a sync header; and
sending a Start Data Stream OS (SDS OS) to indicate the beginning of the data stream.

18. A system comprising:
a host device comprising a physical layer circuitry (PHY); and
a downstream device connected to the host device by a multilane link;
the PHY to:
send, on the multilane link, a data stream as a series of data stream flow control units (flits),
send a skip ordered set (SKP OS) into the data stream after a predetermined number of data stream flits, and
send the SKP OS on the multilane link;
the PHY to:
determine error correcting code for the data stream; and
distribute the error correcting code across each lane of the data stream flit.

19. The system of claim 18, the PHY to send another series of data stream flits after the SKP OS.

20. The system of claim 18, the PHY is to send an electrical idle ordered set (EIOS) at the end of the data stream.

21. The system of claim 18, the PHY is to send an electrical idle exit ordered set (EIEOS) at the end of the data stream.

22. The system of claim 21, the PHY to send a skip ordered set (SKP OS) after the EIEOS.

23. The system of claim 21, the PHY to cause the link to enter recovery after the EIEOS.

24. The system of claim 18, the PHY to send a start data stream ordered set (SDS OS) flit before the data stream flit to indicate a start of the data stream.

25. The apparatus of claim 24, the data stream absent a sync header.

26. The system of claim 18, wherein the multilane link comprises a link based on a Peripheral Component Interconnect Express (PCIe) protocol.

* * * * *